(12) United States Patent
Sharma et al.

(10) Patent No.: US 7,771,103 B2
(45) Date of Patent: Aug. 10, 2010

(54) OPTICAL DIFFUSER WITH IR AND/OR UV BLOCKING COATING

(75) Inventors: Pramod K. Sharma, Ann Arbor, MI (US); Desaraju V. Varaprasad, Ann Arbor, MI (US); Thomas J. Taylor, Northville, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 676 days.

(21) Appl. No.: 11/326,606

(22) Filed: Jan. 6, 2006

(65) Prior Publication Data
US 2007/0064446 A1 Mar. 22, 2007

Related U.S. Application Data

(63) Continuation-in-part of application No. 11/229,837, filed on Sep. 20, 2005, and a continuation-in-part of application No. 11/314,735, filed on Dec. 22, 2005, and a continuation-in-part of application No. 11/324,756, filed on Jan. 4, 2006, and a continuation-in-part of application No. 11/324,758, filed on Jan. 4, 2006.

(51) Int. Cl.
*F21V 5/00* (2006.01)
*B32B 17/06* (2006.01)
*B32B 9/00* (2006.01)

(52) U.S. Cl. .................. 362/618; 428/701; 428/702; 428/432; 428/699; 362/330

(58) Field of Classification Search .................. None
See application file for complete search history.

(56) References Cited

U.S. PATENT DOCUMENTS

| 2,726,965 | A | | 12/1955 | Cressman et al. |
| 3,148,300 | A | * | 9/1964 | Graff .......................... 313/112 |
| 3,459,574 | A | | 8/1969 | Willcox et al. |
| 3,531,677 | A | | 9/1970 | Loughridge et al. |
| 4,353,991 | A | | 10/1982 | Van Ness et al. |
| 4,381,333 | A | | 4/1983 | Stewart et al. |
| 4,390,636 | A | | 6/1983 | Votava |

(Continued)

FOREIGN PATENT DOCUMENTS

DE  20 2006 002 057   5/2006

(Continued)

OTHER PUBLICATIONS

U.S. Appl. No. 11/229,837, filed Sep. 20, 2005.

(Continued)

*Primary Examiner*—Ling Xu
(74) *Attorney, Agent, or Firm*—Nixon & Vanderhye P.C.

(57) ABSTRACT

A diffuser is provided in an illumination system, where the diffuser is capable of blocking significant amounts of infrared (IR) and/or ultraviolet (UV) radiation. In certain example embodiments of this invention, the diffuser includes a glass substrate which supports an IR/UV coating(s) that blocks significant amounts of IR and/or UV radiation thereby reducing the amount of IR and/or UV radiation which can makes its way through the diffuser. In certain example embodiments, the coating may include particulate in a frit matrix so that the coating may both diffuse visible light and perform IR and/or UV blocking.

20 Claims, 14 Drawing Sheets

U.S. PATENT DOCUMENTS

| | | | |
|---|---|---|---|
| 4,441,046 A | 4/1984 | James | |
| 5,196,088 A | 3/1993 | Soda | |
| 5,246,540 A | 9/1993 | Soda | |
| 5,306,674 A | 4/1994 | Ruderer et al. | |
| 5,316,854 A | 5/1994 | Lin et al. | |
| 5,332,618 A | 7/1994 | Austin | |
| 5,371,138 A | 12/1994 | Schaefer et al. | |
| 5,725,919 A | 3/1998 | Roberts et al. | |
| 5,725,957 A | 3/1998 | Varaprasad et al. | |
| 5,940,154 A | 8/1999 | Ukita et al. | |
| 5,949,506 A | 9/1999 | Jones et al. | |
| 6,039,390 A * | 3/2000 | Agrawal et al. | 296/211 |
| 6,040,372 A | 3/2000 | Watanabe et al. | |
| 6,093,749 A | 7/2000 | Watanabe et al. | |
| 6,147,733 A | 11/2000 | Miyamoto et al. | |
| 6,149,888 A | 11/2000 | Ota et al. | |
| 6,164,785 A | 12/2000 | Maekawa | |
| 6,180,224 B1 | 1/2001 | Shouji et al. | |
| 6,275,338 B1 | 8/2001 | Arai et al. | |
| 6,340,646 B1 | 1/2002 | Nagashima et al. | |
| 6,376,066 B1 | 4/2002 | Kanzaki et al. | |
| 6,384,526 B1 | 5/2002 | Peters | |
| 6,433,102 B1 | 8/2002 | Suzuki et al. | |
| 6,521,677 B2 | 2/2003 | Yashiro et al. | |
| 6,573,961 B2 | 6/2003 | Jiang et al. | |
| 6,607,832 B1 | 8/2003 | Nagashima et al. | |
| 6,633,722 B1 | 10/2003 | Minami et al. | |
| 6,649,212 B2 | 11/2003 | Payne et al. | |
| 6,686,047 B2 | 2/2004 | Yamaguchi et al. | |
| 6,723,423 B1 | 4/2004 | Kaneko et al. | |
| 6,787,236 B2 | 9/2004 | Kimura et al. | |
| 6,831,027 B2 | 12/2004 | Gazo | |
| 6,896,934 B2 | 5/2005 | Aronica et al. | |
| 6,917,396 B2 | 7/2005 | Hiraishi et al. | |
| 6,924,037 B1 | 8/2005 | Joret et al. | |
| 6,934,080 B2 | 8/2005 | Saccomanno et al. | |
| 6,940,665 B2 | 9/2005 | Cowan et al. | |
| 6,942,906 B2 | 9/2005 | Sakata et al. | |
| 6,943,342 B2 | 9/2005 | Bechtel et al. | |
| 6,952,507 B2 | 10/2005 | Johnson et al. | |
| 6,963,380 B1 | 11/2005 | Kwon et al. | |
| 6,963,445 B2 | 11/2005 | Hoover et al. | |
| 6,963,688 B2 | 11/2005 | Nath | |
| 7,105,222 B2 | 9/2006 | Marzolin et al. | |
| 7,446,939 B2 | 11/2008 | Sharma et al. | |
| 2003/0146680 A1 | 8/2003 | Wei | |
| 2003/0214812 A1 | 11/2003 | Bourdelais et al. | |
| 2004/0228141 A1 | 11/2004 | Hay et al. | |
| 2005/0105186 A1 | 5/2005 | Kaminsky et al. | |
| 2005/0189524 A1 | 9/2005 | Weng et al. | |
| 2006/0176429 A1 | 8/2006 | Watchi et al. | |
| 2007/0064446 A1 | 3/2007 | Sharma et al. | |

FOREIGN PATENT DOCUMENTS

| | | |
|---|---|---|
| JP | 8-134432 | 5/1996 |
| WO | WO 02/37568 | 5/2002 |

OTHER PUBLICATIONS

U.S. Appl. No. 11/314,735, filed Dec. 22, 2005.
U.S. Appl. No. 11/324,756, filed Jan. 4, 2006.
U.S. Appl. No. 11/324,758, filed Jan. 4, 2006.

* cited by examiner

| Examples | Frit 99 by wt% | Ingredient 1 by Wt% | Oxide by wt% | Thickness (μm) | Tvis (%) | Tuv (%) | b* |
|---|---|---|---|---|---|---|---|
| Example #1 | 99 | 1 $CeO_2$ colloids | 0.2 $CeO_2$ | 4.8 | 38.5 | 2.3 | 17.6 |
| Example #2 | 99.8 | 0.2 ZnO colloids | 0.08 ZnO | 1.8 | 59.6 | 27.1 | 2.8 |
| Example #3 | 90 | 10 $TiO_2$ colloids | 3 $TiO_2$ | 7.6 | 46.1 | 2.2 | 9.4 |

| Example | Frit 99 by wt% | Ingredients 1 by wt% | Oxide by wt% | Ingredients 2 by wt% | Oxide by wt% | Thickness (μm) | Tvis (%) | Tuv (%) | b* |
|---|---|---|---|---|---|---|---|---|---|
| Example #4 | 91.9 | 8 $TiO_2$ colloids | 2.4 $TiO_2$ | | 0.1 $Nb_2O_5$ | 6.9 | 42.5 | 3.5 | 4.8 |
| Example #5 | 91.8 | 8 $TiO_2$ colloids | 2.4 $TiO_2$ | | 0.2 $Co_3O_4$ | 7.0 | 41.3 | 6.5 | 4.1 |
| Example #6 | 97.4 | 2 ZnO colloids | 0.08 ZnO | 0.6 $TiO_2$ colloids | 1.6 $TiO_2$ | 4.8 | 59.7 | 37.9 | 1.5 |
| Example #7 | 97.2 | 2 ZnO colloids | 0.08 ZnO | 0.8 $TiO_2$ colloids | 2.4 $TiO_2$ | 5.7 | 48 | 6.9 | 4.7 |
| Example #8 | 90.2 | 8 $TiO_2$ colloids | 3 $TiO_2$ | | 0.1 $SiO_2$ | 2.3 | 46.1 | 2.2 | 9.4 |
| Example #9 | 90.3 | 2 ZnO colloids | | 7 $TiO_2$ 0.7 $Al_2O_3$ | 0.21wt % $TiO_2$ 0.7 $Al_2O_3$ | 6.6 | 46.3 | 5.6 | 4.3 |

| Example | Mesh size | Thickness (μm) | Tvis (%) | Tuv (%) | b* |
|---|---|---|---|---|---|
| Example #3 | 140 | 6.6 | 46.3 | 5.6 | 4.3 |
| Example #10 | 158 | 6.4 | 48.2 | 1.2 | 10 |
| Example #11 | 380 | 3.8 | 57.4 | 5.2 | 8.4 |

| Example | Mesh size | Thickness (μm) | Tvis (%) | Tuv (%) | b* |
|---|---|---|---|---|---|
| Example #9 | 140 | 7.6 | 46.1 | 2.2 | 9.4 |
| Example #12 | 158 | 6.3 | 53.6 | 3.9 | 8 |
| Example #13 | 280 | 5.2 | 63 | 9 | 5.2 |

Fig. 6

| Example | Frit by %wt | Ingredient 1 by %wt | Mesh size | Thickness (μm) | Tvis % | Tuv % | T$_{IR}$ % | b* |
|---|---|---|---|---|---|---|---|---|
| Example #14 | 95 Frit 8089 | 5 Zincantimonate colloids | 140 | 2.8 | 66.9 | 28.5 | 47.3 | 2.1 |
| Example #15 | 95 Frit 8089 | 5 Zincantimonate colloids | 280 | 1.8 | 75.4 | 35.3 | 59.8 | 1.7 |
| Example #16 | 70 Frit 8089 | 30 Zincantimonate colloids | 140 | 2.3 | 53.1 | 12.3 | 20.5 | 6.0 |
| Example #17 | 70 Frit 8089 | 30 Zincantimonate colloids | 280 | 0.9 | 59.8 | 19.9 | 30.8 | 4.2 |
| Example #18 | 95 Frit 8099 | 5 Zincantimonate colloids | 140 | 2.4 | 56.7 | 23.8 | 42.2 | 2.1 |
| Example #19 | 95 Frit 8099 | 5 Zincantimonate colloids | 280 | 1.9 | 64.0 | 32.4 | 55.5 | 1.6 |
| Example #20 | 70 Frit 8099 | 30 Zincantimonate colloids | 140 | 1.5 | 25.8 | 3.3 | 5.1 | 5.1 |
| Example #21 | 70 Frit 8099 | 30 Zincantimona te colloids | 280 | 1.2 | 36.5 | 9 | 14.0 | 3.3 |

Fig. 23

| Example | Frit by %wt | Ingredient 1 by %wt | Ingredient 2 by %Wt | Mesh size | Thickness (μm) | Tvis % | Tuv % | T$_{IR}$ % | b* |
|---|---|---|---|---|---|---|---|---|---|
| Example #22 | 60 Frit 8099 | 30 Zincantimonate colloids | 10 Titania colloids | 140 | 6.9 | 12.4 | 0.1 | 3.4 | 8.2 |
| Example #23 | 60 Frit 8099 | 30 Zincantimonate colloids | 10 Titania collo ids | 280 | 3.9 | 21.1 | 0.6 | 8.0 | 7.2 |
| Example #24 | 60 Frit 8089 | 30 Zincantimonate colloids | 10 Titania colloids | 140 | 3.2 | 26.8 | 0.9 | 10.8 | 8.0 |
| Example #25 | 60 Frit 8089 | 30 Zincantimonate colloids | 10 Titania colloids | 280 | 1.8 | 32 | 1.4 | 14.4 | 7.8 |

Fig. 24

| Example | Substrate | Ingredient 2 by %Wt | Mesh size | Thickness (μm) | Tvis % | Tuv % | $T_{IR}$ % | b* |
|---|---|---|---|---|---|---|---|---|
| Example #26 | Fluorinated SnO coated | 100 Frit 8099 | 280 | 4.2 | 52.5 | 10 | 21.7 | 5.2 |
| Example #27 | Fluorinated SnO coated | 100 Frit 8089 | 280 | 2.7 | 72.4 | 27.8 | 32.7 | 2.3 |
| Example #28 | Fluorinated SnO coated | 90Frit 8099 +10 Titania colloids | 280 | 5.3 | 28.2 | 1.3 | 13.6 | 5.4 |
| Example #29 | Fluorinated SnO coated | 90Frit 8089 +10 Titania colloids | 280 | 3.4 | 33.1 | 1.1 | 15.6 | 5.8 |
| Example #30 | Double silver coated | 95Frit 8099 +5 Titania colloids | 280 | 3.1 | 24.6 | 1.6 | 2.2 | 6 |
| Example #31 | Double silver coated | 95Frit 8089 +5 Titania colloids | 280 | 2.4 | 45.2 | 5.9 | 3.3 | 9.4 |

Fig. 25

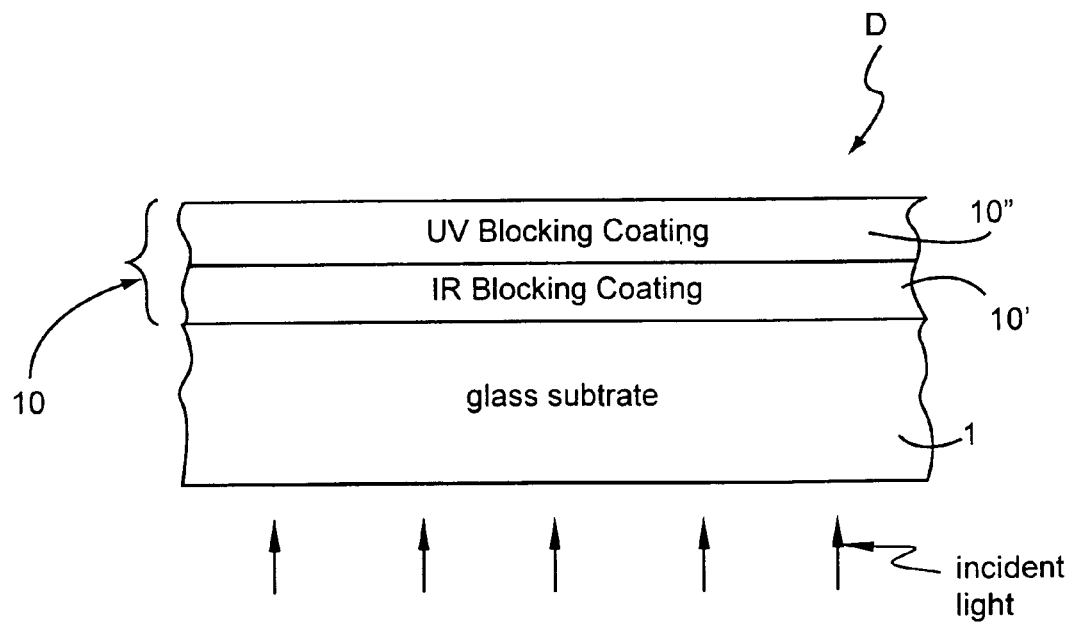

Fig. 26

OPTICAL DIFFUSER WITH IR AND/OR UV BLOCKING COATING

This application is a continuation-in-part (CIP) of each of: U.S. Ser. No. 11/229,837, filed Sep. 20, 2005, U.S. Ser. No. 11/314,735, filed Dec. 22, 2005, entitled Optical Diffuser with UV Blocking Coating; U.S. Ser. No. 11/324,756, filed Jan. 4, 2006, and U.S. Ser. No. 11/324,758, filed Jan. 4, 2006, the entire disclosures of which are all hereby incorporated herein by reference.

This invention relates to a diffuser for use in optical devices. In certain example embodiments, the diffuser includes both diffusing functionality and a coating for blocking substantial amounts of infrared (IR) and/or ultraviolet (UV) radiation. One or more IR blocking pigments (e.g., zinc antimonite, fluorinated tin oxide, or an IR coating including at least one IR reflecting layer of a material such as silver) may be provided in the coating in certain example embodiments so as to block IR radiation. Inorganic UV blocking material may be mixed with a frit (e.g., glass frit) matrix in certain example embodiments of this invention, to make up the UV blocking coating (which may or may not include IR blocking pigment in different embodiments). In different example embodiments, the IR and UV blocking materials may or may not be used in combination with each other in a coating of the diffuser.

BACKGROUND OF THE INVENTION

Diffusers are known in the art. Diffusers are for widely scattering and/or spreading light, and are used in many different optical application including but not limited to wrist watches, projection systems, displays, computer screens, surgical equipment, optical communication systems, light sensors, fiber optic systems, microscope illumination systems, light guides, and so forth. Infrared (IR) and/or ultraviolet (UV) radiation can damage one or more of the aforesaid devices in which diffusers may be used. However, unfortunately, conventional diffusers do not block sufficient infrared (IR) and/or ultraviolet (UV) radiation which can lead to damage in one or more of the aforesaid optical devices.

Accordingly, it has been found that there exists a need in the art for a diffuser than can both function as a diffuser and block significant amounts of IR and/or UV radiation.

Additionally, it has been found that certain organic coatings are not heat resistant, and cannot withstand the high temperatures associated with thermal tempering of glass substrates. In particular, certain organic materials may undergo decomposition at high temperatures. Such organics may also suffer from a lack of mechanical durability, and thus are susceptible to yield loss. Moreover, in certain applications where a diffuser or organic coating thereon is subjected to high operating temperatures over prolonged times, organic based coatings tend to exhibit discoloration.

Thus, it will be appreciated that there also exists a need in the art for a high temperature resistant IR and/or UV coating that is mechanically durable, and is capable of withstanding the high temperatures (e.g., from about 580 to 800 degrees C.) associated with thermal tempering of glass substrates. It is noted, however, that this invention is not so limited. Organic and/or non-heat-resistant coatings may be used in certain example embodiments of this invention, although they are not suitable for all applications.

BRIEF SUMMARY OF EXAMPLE EMBODIMENTS OF THE INVENTION

A diffuser is provided in an illumination system, where the diffuser is capable of blocking significant amounts of IR and/or UV radiation. In certain example embodiments of this invention, the diffuser includes a glass substrate which supports a IR/UV coating(s) that blocks significant amounts of IR and/or UV radiation thereby reducing the amount of IR and/or UV radiation which can makes its way through the diffuser. Optionally, the IR and/or UV blocking coating may also perform a light diffusing function.

In certain example embodiments of this invention, a diffuser includes a glass substrate which has am IR/UV coating thereon. The phrase "IR/UV" means that the coating is capable of blocking significant amounts of IR and/or UV radiation. Optionally, the IR/UV coating may be provided on one side of the glass substrate and a diffusing coating on the other side of the glass substrate. In another example embodiment, a single coating provides both IR/UV blocking and light diffusing functions. In another example embodiment of this invention, a diffuser includes a glass substrate including a roughened (e.g., roughened by etching or the like) surface for diffusing light, and an IR/UV coating provided on the glass substrate over the roughened surface. In still further example embodiments of this invention, a diffuser includes a glass substrate including a roughened (e.g., roughened by etching or the like) surface for diffusing light, and an IR/UV coating provided on the major surface of the glass substrate opposite the roughened surface. The IR/UV coating functions to block (absorb and/or reflect) significant amounts of IR and/or UV radiation.

In certain example embodiments of this invention, the IR/UV coating formulation may based on the incorporation of IR blockers (e.g., IR blocking and/or reflecting material) and/or UV blockers (e.g., UV absorbing materials) into a high temperature curable glassy matrix such as a glass inclusive frit. Example IR blockers which may be used in the glassy matrix include zinc antimonite, fluorinated tin oxide, or a silver based layer(s). Example heat resistant UV blockers which may be used in the glassy matrix include inorganic oxides of metals such as Ce, Zn, Bi, Ti, Sn and/or Sb. Surprisingly, it has been found that the use of such IR and/or UV blockers in a glassy matrix such as frit results in an IR/UV coating that is mechanically durable, optionally heat resistant, and optionally capable of going through a thermal tempering process along with the supporting glass substrate without significant degradation. In certain example embodiments, the IR/UV coating is capable of withstanding the high temperatures (e.g., from about 580 to 800 degrees C.) associated with thermal tempering of the supporting glass substrate without significant degradation in IR and/or UV blocking or transmission characteristics, thereby providing a temperable glass based diffuser.

Diffusers according to certain example embodiments of this invention may be used in an illumination system in any suitable optical application, including but not limited to applications such as wrist watches, projection systems, display backlights, computer screens, surgical equipment, optical communication systems, light sensors, fiber optic systems, microscope illumination systems, and light guides.

In certain example embodiments of this invention, there is provided an illumination system comprising: a light source for emitting light, the light emitted from the light source including at least visible light as well as infrared (IR) and/or ultraviolet (UV) radiation; a diffuser positioned so as to receive light from the light source, the diffuser diffusing visible light received from the light source; and wherein the diffuser comprises a glass substrate that supports an IR blocking coating, so that the diffuser has a transmission at a wavelength of about 2300 nm of no greater than about 45%.

In other example embodiments of this invention, there is provided an optical diffuser for use in an illumination system, the optical diffuser comprising: a glass substrate that supports an IR and/or UV blocking coating, wherein the diffuser is characterized by one or both of: (a) a $T_{UV}$ (UV transmission) of no greater than about 20%, and wherein the UV blocking coating comprises at least one inorganic metal oxide for blocking significant amounts of UV radiation, and wherein the at least one inorganic metal oxide is provided in a frit; and/or (b) a transmission at a wavelength of about 2300 nm of no greater than about 45%.

In certain example embodiments of this invention, there is provided an illumination system comprising: a light source for emitting light, the light emitted from the light source including at least visible light and ultraviolet (UV) radiation; a diffuser positioned so as to receive light from the light source, the diffuser diffusing visible light received from the light source; and wherein the diffuser comprises a glass substrate that supports a UV blocking coating, so that the diffuser has a $T_{UV}$ (UV transmission) of no greater than about 20%, and wherein the UV blocking coating comprises inorganic oxide(s) of one or more of Ce, Zn, Bi, Ti, Sn and/or Sb in a glass frit. The coating may or may not include IR blocking material.

In certain example embodiments of this invention, the UV blocking coating comprises, by weight, from about 0.1 to 10% (or from about 0.1 to 5%) of the inorganic oxide(s) of one or more of Ce, Bi, Ti, Sn and/or Sb.

In certain example embodiments of this invention, there is provided an optical diffuser for use in an illumination system, the optical diffuser comprising: a glass substrate that supports a UV blocking coating, wherein the diffuser has a $T_{UV}$ (UV transmission) of no greater than about 20%, and wherein the UV blocking coating comprises at least one inorganic metal oxide for blocking significant amounts of UV radiation, and wherein the at least one inorganic metal oxide is provided in a frit. The coating may or may not include IR blocking material.

BRIEF DESCRIPTION OF THE DRAWINGS

FIG. 6 illustrates the make-up of UV blocking coatings of Examples 1-13 according to different examples of the instant invention.

FIG. 23 illustrates the make-up of IR/UV blocking coatings of Examples 14-21 according to different examples of the instant invention, and optical properties of diffusers of these examples.

FIG. 24 illustrates the make-up of IR/UV blocking coatings of Examples 22-25 according to different examples of the instant invention, and optical properties of diffusers of these examples.

FIG. 25 illustrates the make-up of IR/UV blocking coatings of Examples 26-31 according to different examples of the instant invention, and optical properties of diffusers of these examples.

FIG. 26 is a cross sectional view of a diffuser according to yet another example embodiment of this invention, the diffuser having multiple layers on the glass substrate.

DETAILED DESCRIPTION OF EXAMPLE EMBODIMENTS OF THE INVENTION

Figure 1:
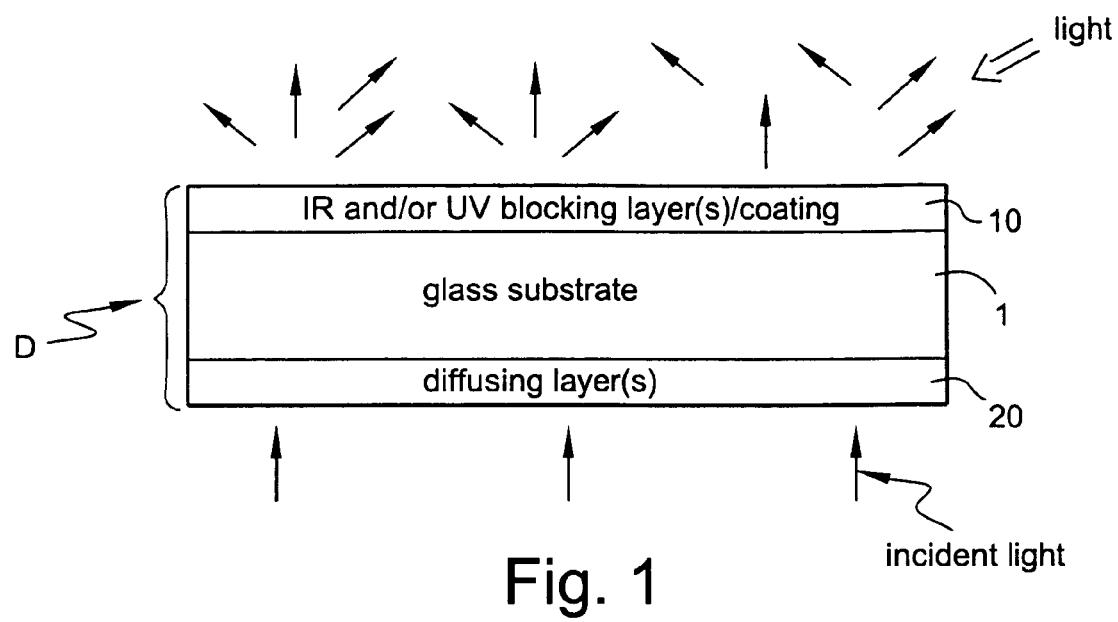
FIG. 1 is a cross sectional view of a diffuser according to an example embodiment of this invention.

Referring now more particularly to the figures where like reference numerals indicate like parts throughout the several views.

This invention relates to a diffuser for use in illumination systems for optical devices/systems. A diffuser is provided that both functions as a diffuser and blocks significant amounts of IR radiation (1000-2400 nm) and/or UV radiation (300-380 nm). In certain example embodiments of this invention, the diffuser includes a glass substrate which supports an IR/UV coating(s) 10 that blocks significant amounts of IR and/or UV radiation thereby reducing the amount of IR and/or UV radiation which can makes its way through the diffuser. Because the diffuser blocks significant amounts of IR and/or UV radiation, the amount of IR and/or UV radiation making its way through the diffuser and into the active area of the optical device is reduced thereby reducing the amount of potential damage which can be inflicted on the optical device by the IR and/or UV radiation. For example, UV radiation tends to cause certain materials to degrade thereby reducing the lifespan of one or more of the optical devices mentioned herein. As another example, IR radiation tends to cause significant heat build-ups which can damage or reduce the lifespan of one or more of the optical devices mentioned herein. Diffusers according to certain example embodiments of this invention thus provide for blockage of significant amounts of IR and/or UV radiation while retaining adequate transmission of light in the visible region/range.

Diffusers according to certain example embodiments of this invention (see FIGS. 1-5) may be used in any suitable optical application, including but not limited to applications such as wrist watches, projection systems, display (e.g., liquid crystal display) backlights, computer screens, surgical equipment, optical communication systems, light sensors, fiber optic systems, microscope illumination systems, and light guides. In certain example embodiments of this invention, the diffuser is a glass based product that can both block (reflect and/or absorb) significant amounts of IR and/or UV radiation and provide glare reduction from one or both surfaces. In certain example embodiments, the diffuser may acts as a Lambertian or quasi-Lambertian diffuser.

Plastic diffusers have been known in the art. However, plastic based diffusers may be susceptible to high temperatures (e.g., high operating temperatures) associated with one or more of the aforesaid optical devices. Thus, in certain example non-limiting embodiments of this invention, the diffuser includes a glass substrate 1 which is more durable and can withstand high temperature applications and which does not degrade upon UV exposure.

In certain example embodiments of this invention, the IR/UV coating 10 formulation is based on the incorporation of IR and/or UV blockers into a high temperature curable glassy matrix such as a glass inclusive frit. Example IR blockers which may be used in the glassy matrix include zinc antimonite, fluorinated tin oxide, and/or a silver based layer(s) in a coating such as a low-E coating. Example heat resistant UV blockers which may be used in the glassy matrix include inorganic oxides of one or more of Ce, Zn, Bi, Ti, Sn and/or Sb. Surprisingly, it has been found that the use of such IR and/or UV blockers in a glassy matrix such as frit results in an IR/UV coating that can be highly mechanically durable, optionally heat resistant, and optionally capable of going through a thermal tempering process along with the supporting glass substrate without significant degradation. In certain example embodiments, the IR/UV coating 10 is capable of withstanding the high temperatures (e.g., from about 580 to 800 degrees C.) associated with thermal tempering of the supporting glass substrate 1 without significant degradation in IR and/or UV blocking or transmission characteristics.

FIG. 1 is cross sectional view of a diffuser D according to an example embodiment of this invention. The diffuser D of the FIG. 1 embodiment includes a glass substrate 1, an IR/UV blocking coating 10, and a diffusing coating 20. The glass substrate 1 may be a soda-lime-silica based glass substrate according to certain example embodiments of this invention, and may or may not be heat treated (e.g., thermally tempered). Each of the coatings 10, 20 may include one or more layers in different embodiments of this invention. In the FIG. 1 embodiment, the IR/UV blocking coating 10 functions to block significant amounts of IR and/or UV radiation that was present in the incident light from the light source(s) of the illumination system, whereas the diffusing coating 20 causes the incident light to substantially spread out or scatter as it moves through the glass substrate 1. Each of the IR/UV blocking coating 10 and the diffusing coating 20 do not block significant amounts of visible rays (e.g., no more than about 25% each, more preferably no more than about 10% each), so that efficiency of transmission of visible radiation is retained and/or maintained by the diffuser. In certain example instances, the optional diffusing coating 20 may be a coating that includes a frit composition for diffusing purposes, or may be a coating that includes a plurality of particles (e.g., particles of $TiO_2$, $Al_2O_3$, $SiO_2$ and/or the like) suspended in a solution or resin for diffusing visible light. In the FIG. 1 embodiment, the IR/UV coating 10 and the diffusing coating 20 are on opposite major sides of the glass substrate 1. In certain instances, the coating 20 may be omitted and the IR/UV coating 10 may include diffusing particles such as frit so as to perform the light diffusing function in addition to the IR/UV blocking function.

Figure 2:
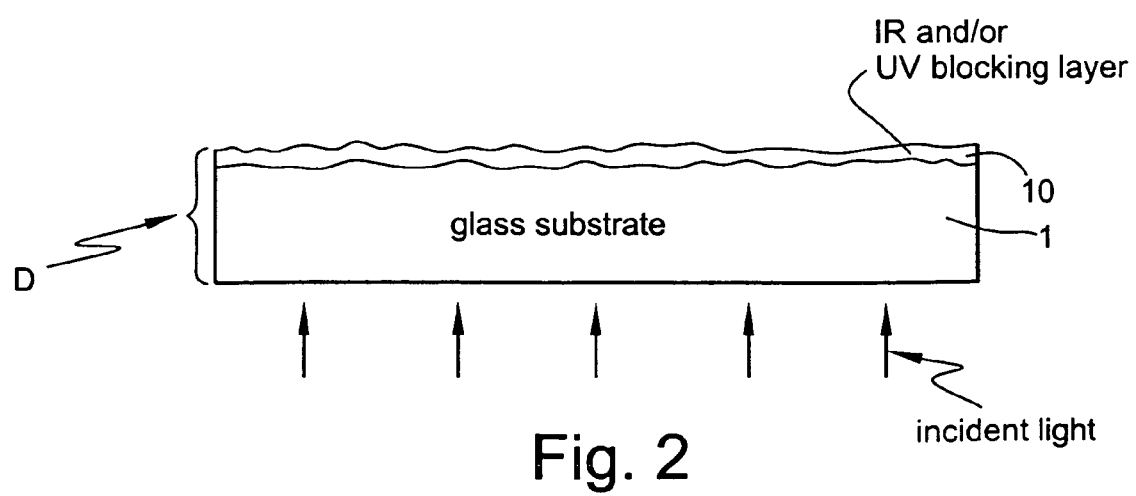
FIG. 2 is a cross sectional view of a diffuser according to another example embodiment of this invention.

FIG. 2 is a cross sectional view of a diffuser D according to another example embodiment of this invention. Like the FIG. 1 embodiment, the diffuser of FIG. 2 includes a glass substrate 1 and an IR/UV blocking coating 10. However, in the FIG. 2 embodiment, at least one major surface of the glass substrate 1 is roughened to provide a light scattering diffusing effect. In the illustrated FIG. 2 embodiment, the surface of the glass substrate 1 under the IR/UV blocking coating 10 has been roughened to provide a roughened surface R for scattering/spreading visible light so that the product can function as a diffuser. The surface roughening of the glass substrate 1 may be performed in any suitable manner, including but not limited to etching of the glass using a hydrofluoric acid based solution (HF-etched glass), sand-blasting of the glass, or any other technique for etching of the glass surface. The incident light is diffused by the roughened surface R due to the differences in indices of refraction along the roughened area between the glass and the overlying coating and air. In this embodiment, the roughened surface R of the glass 1 and/or the coating 10 provides the visible light diffusing function, whereas the IR/UV coating 10 provides the function of blocking significant amounts of IR and/or UV radiation. Coating 10 may also perform a light diffusing function in certain example instances.

Figure 3:
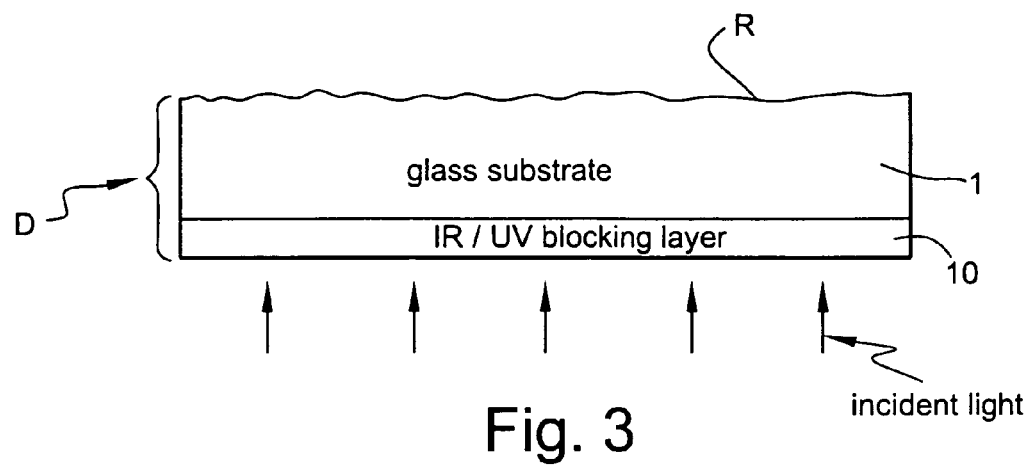
FIG. 3 is a cross sectional view of a diffuser according to yet another example embodiment of this invention.

FIG. 3 is a cross sectional view of a diffuser D according to yet another example embodiment of this invention. Like the FIG. 1 embodiment, the diffuser of FIG. 2 includes a glass substrate 1 and an IR/UV blocking coating 10. However, in the FIG. 3 embodiment, at least one major surface of the glass substrate 1 is roughened to provide a light scattering diffusing effect. In the illustrated FIG. 3 embodiment, the front surface of the glass substrate 1 (i.e., the surface furthest from the light source(s) of the illumination system) has been roughened to provide a roughened surface R for scattering/spreading visible light so that the product can function as a diffuser. The surface roughening of the glass substrate 1 may be performed in any suitable manner, including but not limited to etching of the glass using a hydrofluoric acid based solution (HF-etched glass), sand-blasting of the glass, or any other technique for etching of the glass surface. The incident light is diffused by the roughened surface R due to the differences in indices of refraction along the roughened area between the glass and the overlying coating and air. In this FIG. 3 embodiment, the IR/UV coating 10 is provided on the surface of the glass substrate opposite the roughened surface R. In this embodiment, the roughened surface R of the glass 1 provides the visible light diffusing function, whereas the IR/UV coating 10 provides the function of blocking significant amounts of IR and/or UV radiation. While the FIG. 3 embodiment illustrates the front surface being roughened and the rear surface of the glass substrate having the IR/UV blocking coating 10 thereon, this invention is not so limited as the positions of the IR/UV blocking coating 10 and the roughened surface R could be reversed in alternative embodiments of this invention. In other words, in alternative embodiments the rear surface of the glass substrate could be roughened and the IR/UV coating 10 could be provided on the front surface of the glass substrate 1.

Figure 4:
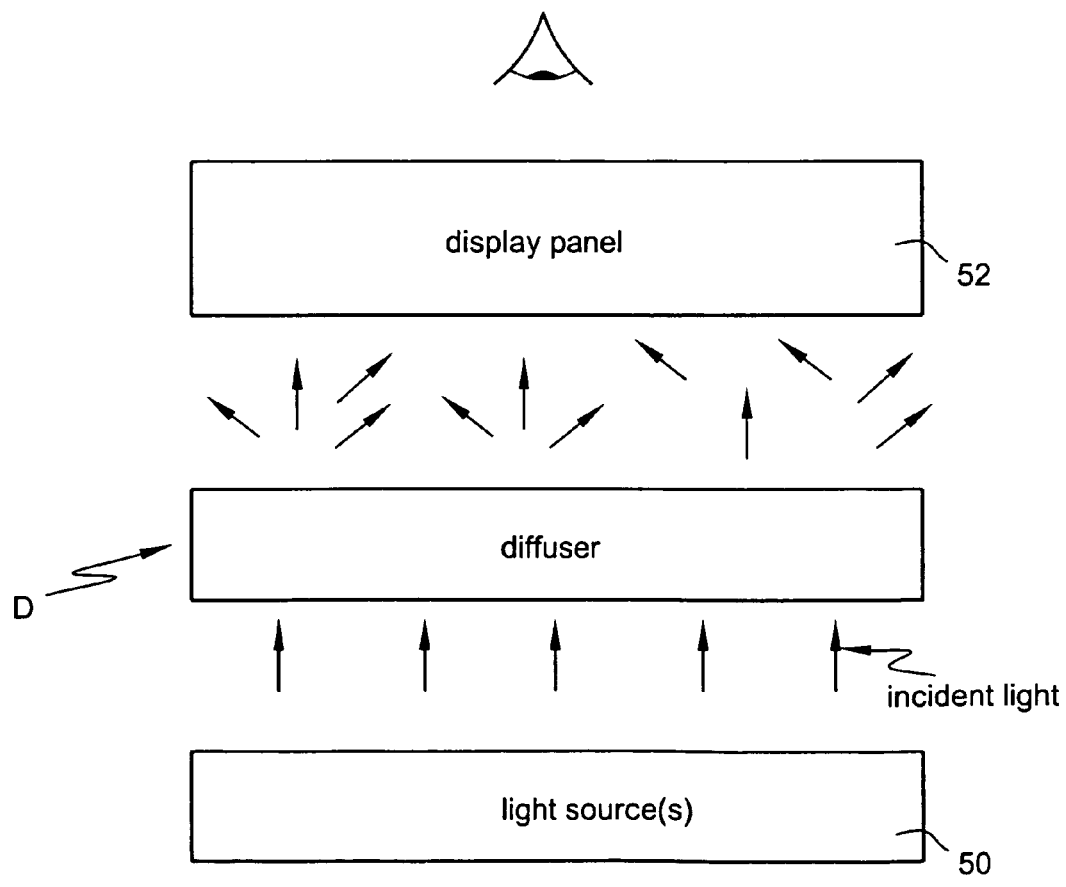
FIG. 4 is a cross sectional schematic diagram of any of the diffusers herein used in an example display application.
Figure 5:
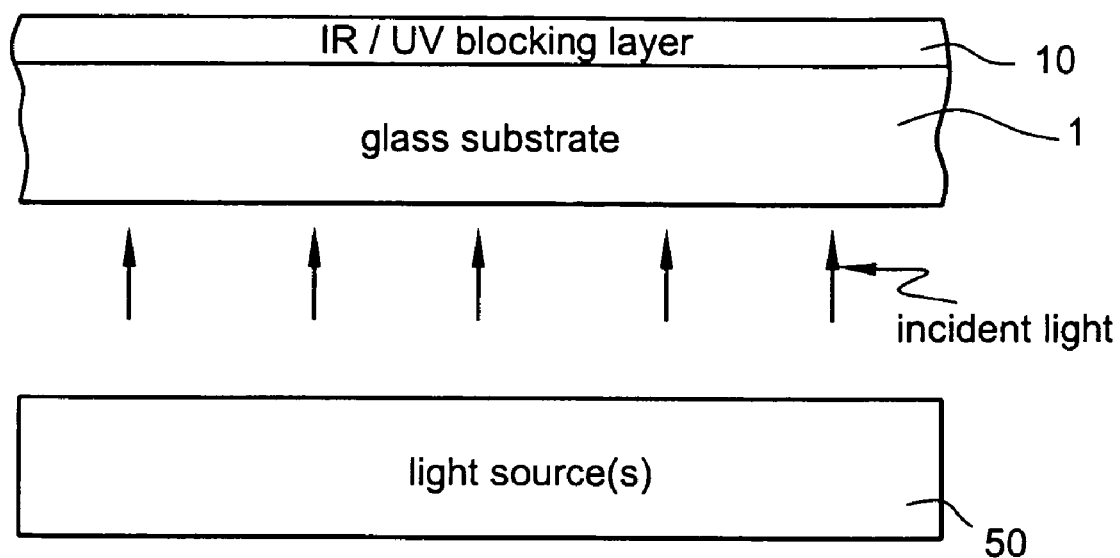
FIG. 5 is a cross sectional view of a diffuser according to another example embodiment of this invention.

FIG. 5 is a cross sectional view of a diffuser D according to still another example embodiment of this invention. In the FIG. 5 embodiment, the coating 10 provides both IR/UV blocking functionality and visible light diffusing functionality. In other words, both the diffusing and UV blocking functions are performed by the same coating 10 in this embodiment. Stated another way, the IR/UV coating 10 in this embodiment has been modified so that the IR/UV coating also acts as a diffuser. This may be achieved by providing filler particulate material(s) such as silica (e.g., in frit), alumina and/or titania in the IR/UV coating 10 with the filler particulate material acting to reflect and thus spread/scatter visible light rays passing through the coating 10. In certain example instances, particles of one or more of silica (e.g., in a form such as frit), titania, alumina, or zirconia may be mixed with radiation absorbing additives such as UV and/or IR (infrared) blockers in a compatible binder matrix material to render the resultant coating 10 an effective scatterer of visible light and blocker of damaging UV and/or IR radiation. In certain instances, the same particles may function to block IR and/or UV, and diffuse light passing through the coating 10. It is also possible to imprint a fine pattern onto a clear coating 10 to cause it to function as a non-glare coating instead of or in addition to a diffusing coating in alternative example embodiments. This coating 10 of the FIG. 5 embodiment, which functions as both a light diffuser and IR/UV blocker, may be used in conjunction with any of the other embodiments discussed herein in certain example instances (e.g., see FIGS. 1-4).

In certain example embodiments, it is also possible to add fluorescent material(s) to the IR/UV coating 10 of any of the embodiments discussed herein. These may be selected to absorb IR and/or UV and re-emit visible light, thereby increasing efficiency of the illumination system.

Example IR/UV blocking coatings 10, which may be used in any of the aforesaid embodiments, will now be discussed.

In certain example embodiments, a UV blocking coating 10 is of or includes one or more UV blockers provided in a high temperature curable glassy matrix such as a glass inclusive frit (an Example frit is Ferro frit 20-8099 available from Ferro Corporation of Ohio). Example heat resistant UV blockers which may be mixed with the frit include inorganic oxides of one or more of Ce, Zn, Bi, Ti, Sn and/or Sb. In certain example embodiments, the UV coating 10 includes from about 0.05 to 15% of UV blocker(s) (e.g., oxide of one or more of Ce, Zn, Bi, Ti, Sn and/or Sb), more preferably from about 0.1 to 10%, even more preferably from about 0.1 to 5%, and most preferably from about 0.2 to 3%. The UV blocker(s) may or may not be provided in a suspension such as water in certain example embodiments (e.g., colloid). One or more of the aforesaid UV blocker(s) may be provided in a frit matrix in forming and making up the UV coating 10 according to certain example embodiments of this invention. Moreover, in certain example embodiments, the coating 10 includes at least about 50% frit, more preferably at least about 60% frit, even more preferably at least about 80% frit, more preferably at least about 85%, even more preferably at least about 90%, and possibly at least about 95% or 97%.

In certain example embodiments the diffuser D, including at least the glass substrate 1 and UV blocking coating 10, has a Tuv (UV transmission) of no greater than about 20%, more preferably no greater than about 10%, even more preferably no greater than about 5%, and sometimes no greater than about 3% or 2%. Moreover, in certain example embodiments, the diffuser D with the glass substrate 1 and coating 10 has a transmission for the IR wavelength of 2300 nm of no greater than about 45%, more preferably no greater than about less than about 40%, even more preferably no greater than about 30%, sometimes no greater than about 20%, and possibly no greater than about 10% or 5%. Moreover, in certain example embodiments, the diffuser has a $T_{IR}$ (average transmission at 1000-2400 nm) of no greater than about 45%, more preferably no greater than about less than about 40%, even more preferably no greater than about 30%, sometimes no greater than about 20%, and possibly no greater than about 10%.

In certain example embodiments of this invention, UV blocking coating 10 prevents at least about 50% of UV radiation (300-380 nm) reaching the same from passing therethrough, more preferably at least about 70%, even more preferably prevents at least about 80% of UV radiation reaching the same from passing therethrough, and most preferably prevents at least about 90% (or at least about 95%) of UV radiation reaching the same from passing therethrough. In other words, UV blocking coating 10 preferably blocks at least about 50% of UV radiation (i.e., from 300-380 nm), more preferably at least about 70% of UV radiation, even more preferably at least about 80%, more preferably at least about 90% of UV radiation, and most preferably at least 95% of UV radiation (e.g., see FIGS. 7-12). UV blocking coating 10 may block UV radiation (from 300-380 nm) by, for example and without limitation, reflecting such UV radiation, absorbing such UV radiation, and/or converting amounts of such UV radiation into other type(s) of radiation (e.g., IR), and/or the like.

In certain example embodiments, the diffuser D has a visible transmission of at least about 35%, more preferably of at least about 50%, even more preferably of at least about 60%, and sometimes at least about 70%.

In certain example embodiments of this invention, IR blocking material may be added to any of the UV blocking coatings discussed above. In other example embodiments, the coating 10 may have IR blocking material but need not have UV blocking material.

For example, the coating 10 may be of or include a colloidal electro-conductive oxide solution having both infrared (IR) and ultraviolet (UV) blocking characteristics. In certain example embodiments of this invention, for coating 10, a substantially transparent composite oxide coating is provided that includes a silica matrix, zinc antimonite (an IR blocker), and a UV blocking material, thereby permitting the coating (e.g., applied via a coating sol) after application to block significant amounts of both IR and UV radiation. In certain example embodiments of this invention, a UV and IR blocking coating comprises each of cerium oxide (UV blocker) and zinc antimonite (IR blocker) in the form of nanoparticulate, and silicon oxide (e.g., $SiO_2$) for diffusing purposes. It has surprisingly been found that such coatings are effective at blocking both UV and IR radiation, and also are resistant to high temperatures as spectral response remains substantially unchanged in certain example instances after one or two hours of substantial heating (e.g., to about 400 or 450 degrees C.). In certain example embodiments, the coated article has transmission for a wavelength of 2300 nm, of less than 10%. In certain example embodiments of this invention, the sol type coating comprises from about 15 to 50% cerium oxide (more preferably from about 20 to 45%, and most preferably from about 30 to 40%), from about 30 to 70% zinc antimonate (more preferably from about 35 to 65%, and most preferably from about 40 to 55%), and from about 5 to 35% silicon oxide (more preferably from about 10 to 30%, and most preferably from about 12 to 25%). However, in other example embodiments, the coating comprises, by weight, from about 5 to 50% zinc antimonate, more preferably from about 5 to 40%, and most preferably from about 10 to 35%. It has been found that these amounts of such materials in the sol type coating provide a coating that is effective at blocking both UV and IR radiation, and is also are resistant to high temperatures. In the case where the colloidal antimony oxide is antimony oxide sol, the method of producing electroconductive anhydrous zinc antimonate inclusive coatings according to certain example embodiments can be produced by, inter alia, mixing antimony oxide sol and a zinc compound, and then calcining the mixture at 300 to 680 degrees C. after drying. The zinc compound which can be used in certain example embodiments is at least one zinc compound selected from the group consisting of zinc hydroxide, zinc oxide, inorganic acid salts of zinc and organic salts of zinc. The inorganic acid salts of zinc include zinc carbonate, basic zinc carbonate, zinc nitrate, zinc chloride, zinc sulfate and the like. The organic acid salts of zinc include zinc formate, zinc acetate, zinc oxalate and the like. These zinc compounds may be those put on the market as industrial chemicals. When zinc hydroxide and zinc oxide are used, it is preferred that they have a primary particle diameter of 100 nm or less. In particular, the salts containing acids that vaporize upon calcination, for example, carbonate salts and organic acid salts, are preferred. They may be used alone or as admixtures of two or more of them. The colloidal antimony oxide which can be used is antimony oxide having a primary particle diameter of 100 nm or less and includes diantimony pentoxide sol, hexaantimony tridecaoxide sol, diantimony tetroxide hydrate sol, colloidal diantimony trioxide and the like. The diantimony pentoxide sol can be produced by known methods, for example, a method in which diantimony trioxide is oxidized, a method in which an alkali antimonate is dealkalized with ion exchange resin, a method in which sodium antimonate is treated with an acid, and/or the like. The hexaantimony tridecaoxide sol can be produced by a method in which diantimony trioxide is oxidized and the diantimony tetroxide hydrate sol can also be produced by a method in which diantimony trioxide is oxidized. The colloidal diantimony trioxide can be produced by a gas phase method in certain example instances.

FIG. 4 illustrates an example embodiment of this invention, where any diffuser D discussed above (e.g., see any of FIGS. 1-3 and 5) or any diffuser in any Example discussed below is used in an illumination system of a display such as a liquid crystal display. The illumination system includes a light source(s) 50 for directing collimated or non-collimated light toward the diffuser D. The light from the source(s) 50 is considered incident light on the diffuser D. The light from the source(s) 50 includes both visible and UV radiation, and possibly IR radiation. The diffuser D (see any of FIGS. 1-3 and 5) scatters/spreads the visible light from the light source(s) 50 and causes a significant amount of the IR and/or UV radiation from the source(s) 50 to be blocked. Thus, the light which makes its way from the diffuser D toward the display panel 52 has less IR and/or UV radiation therein and is diffuse in nature.

In certain example embodiments of this invention, the IR and/or UV blocking coating 10 is from about 1 to 15 μm thick, more preferably from about 1 to 10 μm thick, and most preferably from about 2 to 8 μm thick.

EXAMPLES 1-13

Examples 1-13 are for purposes of example only and without limitation. In each of Examples 1-13, a UV blocking coating 10 was formed on a flat glass substrate. FIG. 6 illustrates the make-up of the coatings 10 of Examples 1-13. In FIG. 6, "Frit 99" refers to Ferro 20-8099 glass frit, and the "thickness" refers to the thickness of the coating 10.

Figure 7:
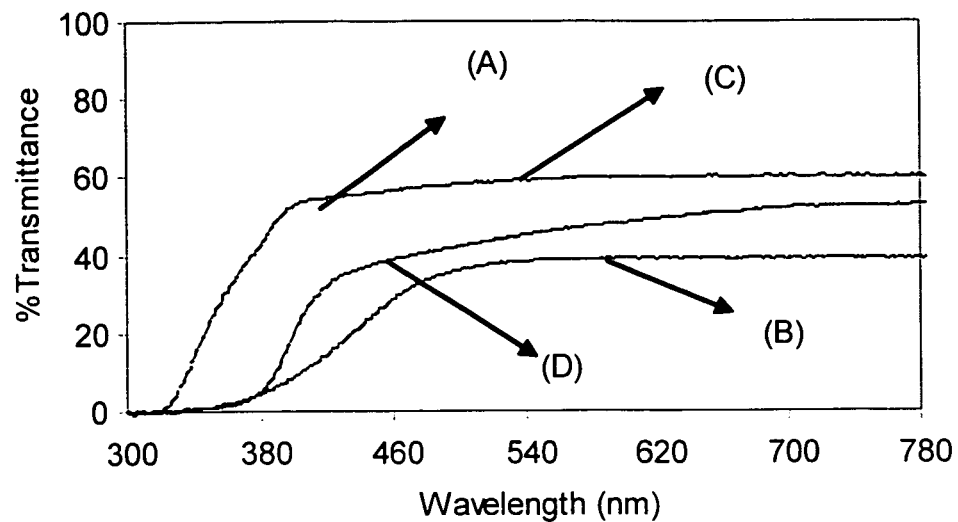
FIG. 7 is a graph illustrating the transmission vs. wavelength characteristics of Examples 1-3 (B, C and D in the figure) compared to frit alone in a coating (A in the figure).
Figure 8:
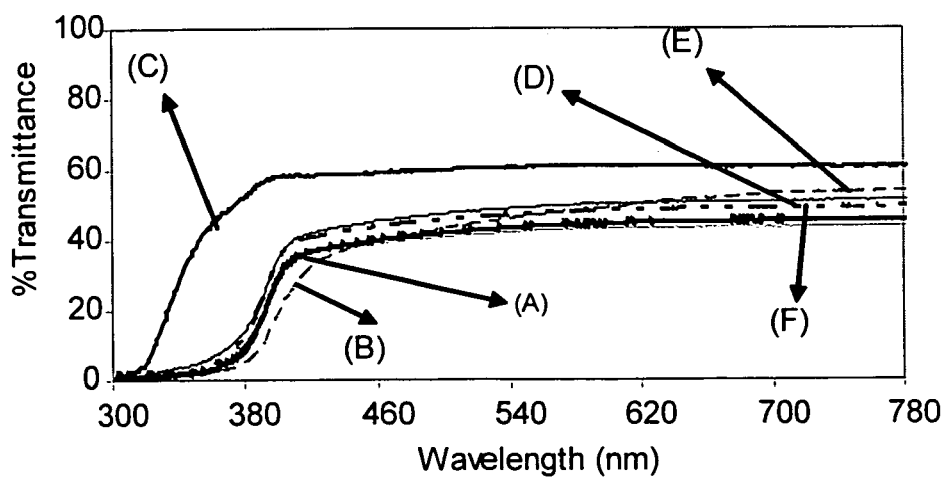
FIG. 8 is a graph illustrating the transmission vs. wavelength characteristics of Examples 4-9.

Example 1 relates to a diffuser as shown in FIG. 5. The diffuser D of Example 1 was made as follows. A composite slurry was made by mixing 99%, by weight, of Ferro 20-8099 frit (glass frit) with 1%, by weight, of a colloidal dispersion of 10-20 nm particle size cerium oxide ($CeO_2$) particles (Nyacol nano ceria) obtained from Nyacol. Nyacol supplied the dispersion of cerium oxide particles in water (i.e., the colloidal dispersion). The cerium oxide acts as a UV blocker. The UV blocking coating was applied on a 3 mm thick glass substrate 1 by using a screen printing technique using screen with a mesh size 140. The coated glass substrate was then subjected to heat treatment at about 625 degrees C. for about 5 minutes, thereby providing a thermally tempered diffuser including a glass substrate 1 with a scratch resistant UV blocking and light diffusing coating 10 thereon. The optical spectrum of the diffuser D of Example 1, including the tempered glass substrate 1 and UV blocking/diffusive coating 10, is shown by curve (B) in FIG. 7, and the diffuser had a Tuv of about 2.3% and a $T_{vis}$ of about 38.5%. For purpose of comparison, curve (A) in FIG. 7 illustrates a Comparative Example diffuser with a glass substrate and a coating of only Ferro 20-8099 frit (with no UV blocker in the coating) prepared under the same conditions. It can be seen that the diffuser of Example 1 ((B) in FIG. 7) had a much better (lower) transmission in the UV range (i.e., from 300-380 nm) compared to the Comparative Example ((A) in FIG. 7). Moreover, the Comparative Example diffuser, with no cerium oxide in the coating, had a Tuv of about 22.3% and a $T_{vis}$ of about 57.3%.

Example 2 relates to a diffuser as shown in FIG. 5. The diffuser D of Example 2 was made as follows. A composite slurry was made by mixing 99.8%, by weight, of Ferro 20-8099 frit (glass frit) with 0.2%, by weight, of a colloidal dispersion of 20-40 nm particle size zinc oxide (ZnO) particles (Nano Z) obtained from Buhler. The casting method and heat treatment were the same as in Example 1, with the glass substrate being the same thickness. The optical spectrum of the diffuser D of Example 2, including the tempered glass substrate 1 and coating 10, is shown by curve (C) in FIG. 7, and the diffuser had a Tuv of about 27.1% and a $T_{vas}$ of about 59.6%. For purpose of comparison, curve (A) in FIG. 7 illustrates a Comparative Example diffuser with a glass substrate and a coating of only Ferro 20-8099 frit (with no ZnO in the coating) prepared under the same conditions. The Comparative Example diffuser, with no zinc oxide in the coating, had a Tuv of about 22.3% and a $T_{vis}$ of about 57.3%. Thus, it will be appreciated that the zinc oxide particles in the coating of Example 2 did not result in any improvement in UV blockage.

Example 3 relates to a diffuser as shown in FIG. 5. The diffuser D of Example 3 was made as follows. A composite slurry was made by mixing 90%, by weight, of Ferro 20-8099 frit (glass frit) with 10%, by weight, of a colloidal dispersion of 280 nm particle size titanium oxide (e.g., $TiO_2$) particles obtained from Elements. The titanium oxide acts as a UV blocker. The UV blocking coating was applied on a 3 mm thick glass substrate 1 by using a screen printing technique using screen with a mesh size 140. The coated glass substrate was then subjected to heat treatment at about 625 degrees C. for about 5 minutes, thereby providing a thermally tempered diffuser including a glass substrate 1 with a scratch resistant UV blocking and light diffusing coating 10 thereon. The optical spectrum of the diffuser D of Example 3, including the tempered glass substrate 1 and UV blocking/diffusive coating 10, is shown by curve (D) in FIG. 7, and the diffuser had a Tuv of about 2.2% and a $T_{vis}$ of about 46.1%. By comparing Example 3 ((D) in FIG. 7) with the Comparative Example (A) in FIG. 7), it can be seen that the diffuser of Example 3 had a much better (lower) transmission in the UV range (i.e., from 300-380 nm) compared to the Comparative Example.

Example 4 relates to a diffuser as shown in FIG. 5. The diffuser D of Example 4 was made as follows. A composite slurry was made by mixing 91.9%, by weight, of Ferro 20-8099 frit with about 8%, by weight, of a colloidal dispersion of 280 nm particle size titanium oxide (e.g., $TiO_2$) particles obtained from Elementis, and 0.1% by weight of 1 µm niobium pentaoxide particles obtained from Aldrich. The UV blocking coating was applied on a 3 mm thick glass substrate 1. The casting method and heat treatment were the same as in Example 1. The optical spectrum of the diffuser D of Example 4, including the tempered glass substrate 1 and UV blocking/diffusive coating 10, is shown by curve (A) in FIG. 8, and the diffuser had a Tuv of about 3.5% and a $T_{vis}$ of about 42.5%.

Example 5 relates to a diffuser as shown in FIG. 5. The diffuser D of Example 5 was made as follows. Example 5 was the same as Example 4, except that the niobium pentaoxide was replaced with about 0.2%, by weight, of 1 µm cobalt oxide particles obtained from Aldrich. The optical spectrum of the diffuser D of Example 5, including the tempered glass substrate 1 and UV blocking/diffusive coating 10, is shown by curve (B) in FIG. 8, and the diffuser had a Tuv of about 6.5% and a $T_{vis}$ of about 41.3%.

Example 6 relates to a diffuser as shown in FIG. 5. The diffuser D of Example 6 was made as follows. A composite slurry was made by mixing 97.4%, by weight, of Ferro 20-8099 frit with about 2%, by weight, of a colloidal dispersion of 20-40 nm particle size zinc oxide particles obtained from Buhler, and 0.6% by weight of colloidal dispersion of 280 nm titanium oxide particles obtained from Elements. The coating was applied on a 3 mm thick glass substrate 1. The casting method and heat treatment were the same as in Example 1. The optical spectrum of the diffuser D of Example 6 is shown by curve (C) in FIG. 8, and the diffuser had a Tuv of about 37.9% and a $T_{vis}$ of about 59.7%. Again, it can be seen that the zinc oxide did not block much UV.

Example 7 relates to a diffuser as shown in FIG. 5. The diffuser D of Example 7 was made as follows. Example 7 was the same as Example 6, except that there was selectively changed the weight percentage of colloidal dispersion of 280 nm titania to 0.8%. The optical spectrum of the diffuser D of Example 7 is shown by curve (D) in FIG. 8, and the diffuser (including the glass and UV blocking coating) had a Tuv of about 6.9% and a $T_{vis}$ of about 48%. It can be seen that the small increase in titania, compared to Example 6, resulted in a much improved (lower) UV transmission.

Example 8 relates to a diffuser as shown in FIG. 5. The diffuser D of Example 8 was made as follows. A composite slurry was made by mixing about 90%, by weight, of Ferro 20-8099 frit with about 8%, by weight, of a colloidal dispersion of 280 nm particle size titanium oxide (e.g., $TiO_2$) particles, and 0.1% by weight of 4-10 µm silicon dioxide particles (TS 100) obtained from Degussa. The UV blocking coating 10 was applied on a 3 mm thick glass substrate 1. The casting method and heat treatment were the same as in Example 1. The optical spectrum of the diffuser D of Example 8, including the tempered glass substrate 1 and UV blocking/diffusive coating 10, is shown by curve (E) in FIG. 8, and the diffuser had a Tuv of about 2.2% and a $T_{vis}$ of about 46.1%.

Example 9 relates to a diffuser as shown in FIG. 5. The diffuser D of Example 9 was made as follows. A composite slurry was made by mixing about 90.3%, by weight, of Ferro 20-8099 frit with about 2%, by weight, of a colloidal dispersion of 20-40 nm particle size zinc oxide particles, 7% colloidal dispersion of 280 nm titanium oxide particles, and 0.7% by weight of 10 µm aluminum oxide particles obtained from Aldrich. The UV blocking coating 10 was applied on a 3 mm thick glass substrate 1. The casting method and heat treatment were the same as in Example 1. The optical spectrum of the diffuser D of Example 9, including the tempered glass substrate 1 and UV blocking/diffusive coating 10, is shown by curve (F) in FIG. 8, and the diffuser had a Tuv of about 5.6% and a $T_{vis}$ of about 46.3%.

Figure 9:
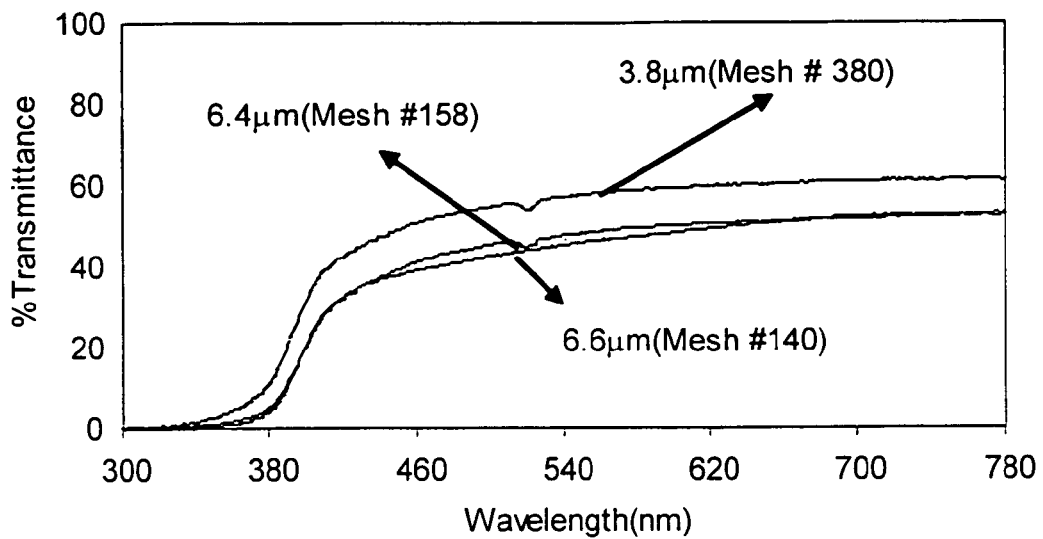
FIG. 9 is a graph illustrating the effect of UV blocking coating thickness on transmission vs. wavelength characteristics, using a UV coatings of Examples 3, 10 and 11 (the curves in FIG. 9 are representative of Examples 3, 10 and 11, respectively).
Figure 10:
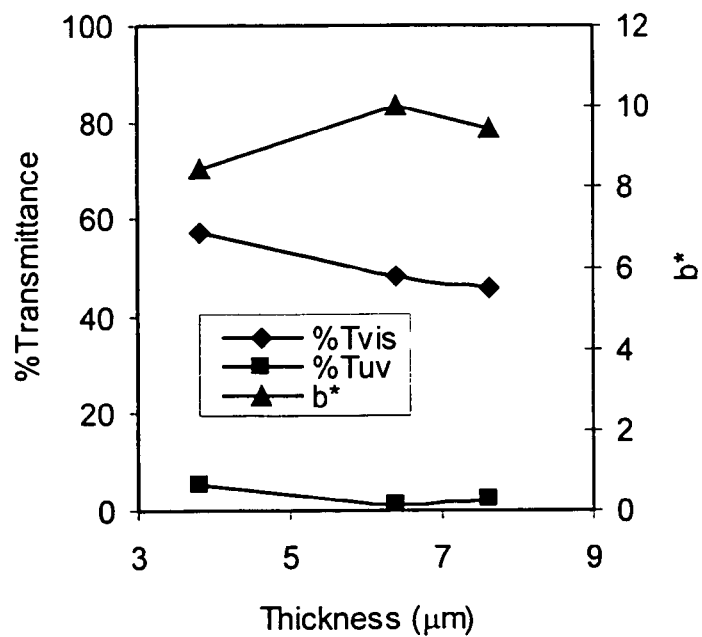
FIG. 10 is a graph illustrating the effect of UV blocking coating thickness on transmission characteristics, using a UV coating material having the makeup of Example 3.

Example 10 is the same as Example 3, except that the screen with mesh size 140 was replaced with a screen with mesh size 158. The optical spectrum of the diffuser D of Example 10, including the tempered glass substrate 1 and UV blocking/diffusive coating 10, is shown in FIG. 9, and the diffuser had a Tuv of about 1.2% and a $T_1$ is of about 48.2%. FIG. 9 illustrates different mesh sizes for screens, and the results thereof on transmission in visible and UV spectrums. In particular, the curves in FIG. 9 are representative of Examples 3, 10 and 11.

Example 11 is the same as Example 3, except that the screen with mesh size 140 was replaced with a screen with mesh size 380. The optical spectrum of the diffuser D of Example 11, including the tempered glass substrate 1 and UV blocking/diffusive coating 10, is shown in FIG. 9, and the diffuser had a Tuv of about 5.2% and a $T_{vis}$ of about 57.4%. FIG. 9 illustrates different mesh sizes for screens, and the results thereof on transmission in visible and UV spectrums. In particular, the curves in FIG. 9 are representative of Examples 3, 10 and 11. FIG. 9 shows that larger mesh number sizes resulted in higher visible transmission characteristics, with the highest mesh size also resulting in a higher UV transmission in certain areas.

Figure 11:
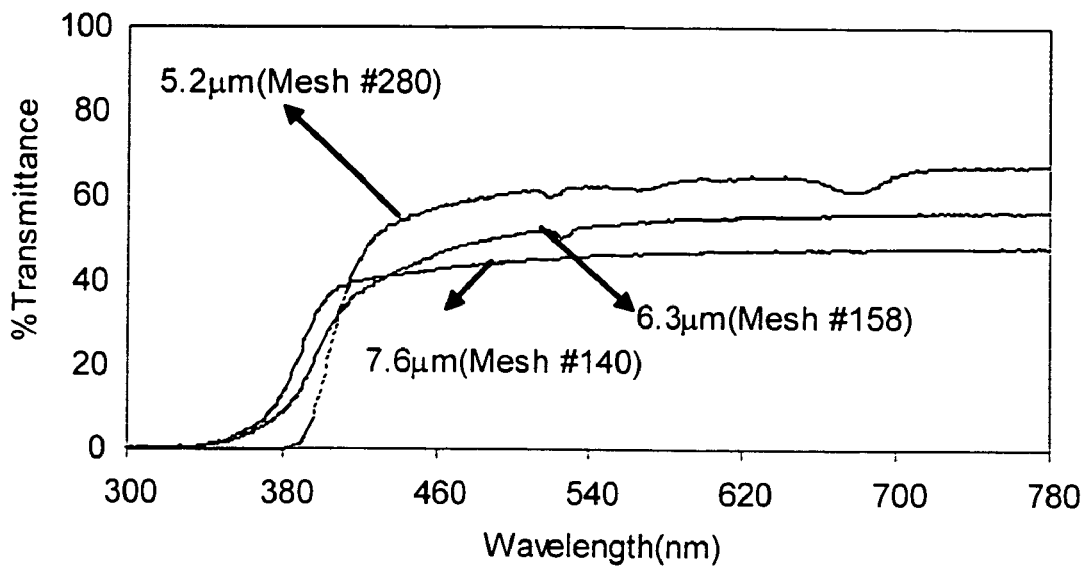
FIG. 11 is a graph illustrating the effect of UV blocking coating thickness on transmission vs. wavelength characteristics, using a UV coating material having the makeup of Example 9 (the curves in FIG. 11 are representative of Examples 9, 12 and 13, respectively).
Figure 12:
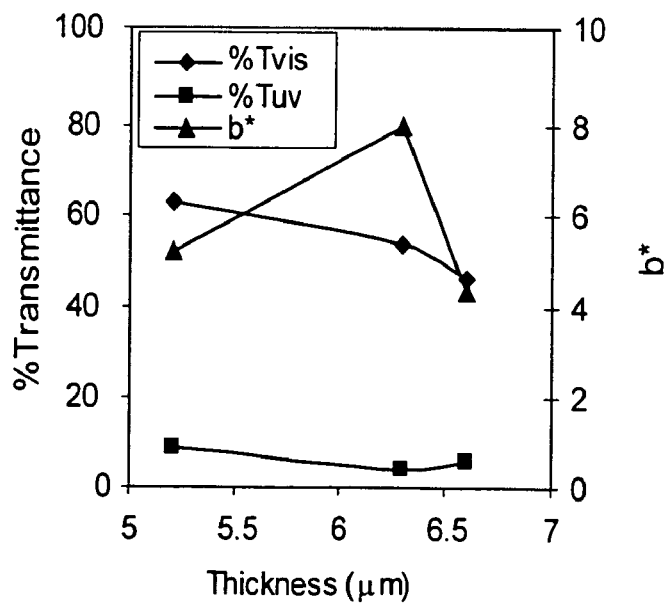
FIG. 12 is a graph illustrating the effect of UV blocking coating thickness on transmission characteristics, using a UV coating material having the makeup of Example 9.

Example 12 is the same as Example 9, except that the screen with mesh size 140 was replaced with a screen with mesh size 158. The optical spectrum of the diffuser D of Example 12, including the tempered glass substrate 1 and UV blocking/diffusive coating 10, is shown in FIG. 11 (see mesh size 158 curve in FIG. 11), and the diffuser had a Tuv of about 3.9% and a $T_{vis}$ of about 53.6%. FIG. 11 illustrates different mesh sizes for screens, and the results thereof on transmission in visible and UV spectrums. In particular, the curves in FIG. 11 are representative of Examples 9, 12 and 13.

Example 13 is the same as Example 12, except that the screen with mesh size 140 was replaced with a screen with mesh size 280. The optical spectrum of the diffuser D of Example 13, including the tempered glass substrate 1 and UV blocking/diffusive coating 10, is shown in FIG. 11 (see mesh size 280 curve in FIG. 11), and the diffuser had a Tuv of about 9% and a $T_{vis}$ of about 63%. Thus, FIG. 11 illustrates the effect of screen mesh size on the thickness of the coating 10 and the optical properties of the coatings containing 90.3% frit, 2% zinc colloids, 7% titania colloids, and 0.7% alumina powder.

It is noted that the coatings 10 of Examples 1-13 contain additives that both scatter light and fluoresce in the presence of UV radiation. Thus, the coatings 10 of Examples 1-13 function as both diffusive coatings and as UV blocking coatings.

While the diffusers of Examples 1-13 are good diffusers and block significant amounts of UV radiation, they are lacking in terms of significant blockage of IR radiation. Examples 14-31 set forth below are for the purpose of set forth example diffusers which block significant amounts of IR radiation, some of which also blocking significant amounts of UV radiation.

EXAMPLES 14-31

Examples 14-31 are for purposes of example only and without limitation. Each of the diffusers of Examples 14-31 functions to block significant amounts of IR radiation, and some of these Examples (e.g., Examples 22-25 and 28-31) also block significant amounts of UV radiation. In each of Examples 14-31, an IR and/or UV blocking coating 10 was formed on a flat glass substrate as shown in FIG. 5. FIGS. 23-25 illustrate the make-up of the coatings 10 of Examples 14-31. In FIGS. 23-25, the "thickness" refers to the thickness of the coating 10, b* is a color value, and mesh size refers to the mesh size of the screen used in applying the coating to the glass substrate 1.

Figure 13:
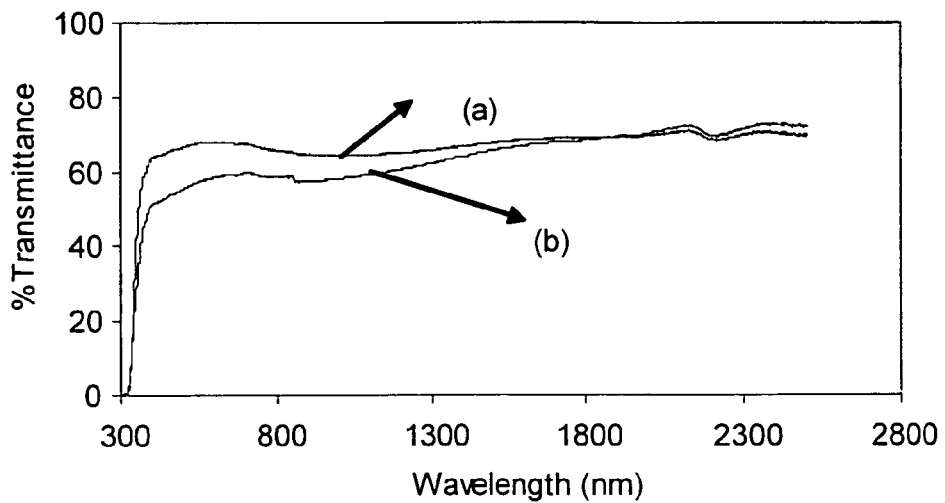
FIG. 13 illustrates transmission vs. wavelength characteristics for two Comparative Examples (CEs). In particular, curve (a) in FIG. 13 illustrates a Comparative Example diffuser with a glass substrate and a coating of only Ferro 20-8089 frit (with no UV or IR or blocker in the coating), and curve (b) in FIG. 13 illustrates a Comparative Example diffuser with a glass substrate and a coating of only Ferro 20-8099 frit (with no UV or IR blocker in the coating).

Example 14 relates to a diffuser as shown in FIG. 5. The diffuser D of Example 14 was made as follows. A composite slurry was made by mixing 95%, by weight, of Ferro 20-8099 frit (glass frit) with 5%, by weight, of a colloidal dispersion of 10-20 nm particle size zinc antimonate obtained from Nissan Chemicals. The zinc antimonate (same as antimonite herein) acts as an IR blocker. The IR blocking coating was applied on a 3 mm thick glass substrate 1 by using a screen printing technique using screen with a mesh size 140. The coated glass substrate was then subjected to heat treatment at about 625 degrees C. for about 5 minutes, thereby providing a thermally tempered diffuser including a tempered glass substrate 1 with a scratch resistant IR blocking and light diffusing coating 10 thereon. The optical spectrum of the diffuser D of Example 14, including the tempered glass substrate 1 and IR blocking/diffusive coating 10, is shown by curve (a) in FIG. 15, and the diffuser had a $T_{IR}$ (IR transmission) of about 47.3%, a Tuv of about 28.5%, and a $T_{vis}$ of about 66.9%. For purpose of comparison, curve (a) in FIG. 13 illustrates a Comparative Example diffuser with a glass substrate and a coating of only Ferro 20-8089 frit (with no IR or blocker in the coating) prepared under the same conditions, and curve (b) in FIG. 13 illustrates a Comparative Example diffuser with a glass substrate and a coating of only Ferro 20-8099 frit (with no IR or blocker in the coating) prepared under the same conditions. It can be seen that the diffuser of Example 14 ((a) in FIG. 15) had a much better (lower) transmission in the IR range compared to the Comparative Example ((a) and (b) in FIG. 13). In particular, by comparing the diffusers have mere frit coatings (a) and (b) in FIG. 13 with the Example 14 diffuser with the IR blocking coating 10 (a) in FIG. 15, it can be seen that Example 14 diffuser had much improved IR blockage (i.e., IR transmission was substantially reduced in Example 14 compared to the Comparative Examples of FIG. 13). It is noted that the Comparative Example diffuser (a) from FIG. 13, with no IR blocker in the coating, had a Tuv of about 29.3% and a $T_{vis}$ of about 67.5%.

Figure 15:
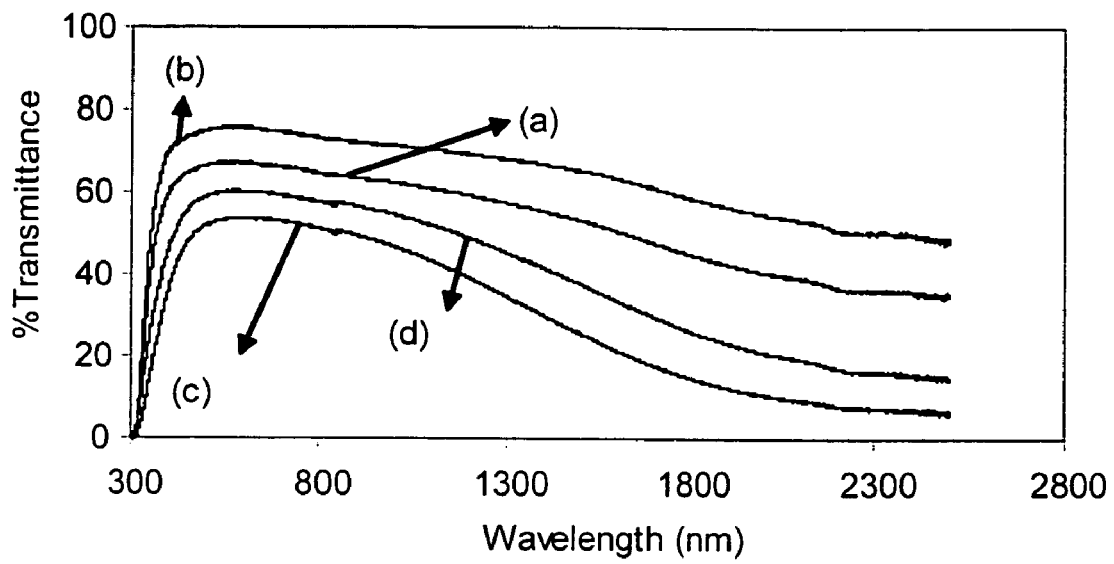
FIG. 15 is a transmission v. wavelength graph illustrating the optical characteristics of Examples 14-17.

As will be appreciated, in certain example embodiments, the diffuser D with the glass substrate 1 and IR (and optionally UV) coating 10 has a transmission for the IR wavelength of 2300 nm of no greater than about 45%, more preferably no greater than about less than about 40%, even more preferably no greater than about 30%, sometimes no greater than about 20%, and possibly no greater than about 10% or 5%. Moreover, in certain example embodiments, the diffuser D with the glass substrate 1 and IR (and optionally UV) coating 10 has a $T_{IR}$ of no greater than about 45% (or even 50% in certain instances), more preferably no greater than about 40%, even more preferably no greater than about 30%, sometimes no greater than about 20%, and possibly no greater than about 10%. As will be appreciated by those skilled in the art, $T_{IR}$ is broader than IR at 2300 nm since $T_{IR}$ takes into account the IR spectrum. In particular, $T_{IR}$ is the average transmission from 1000-2400 nm. Likewise, $T_{VIS}$ is an average transmission from 400-780 nm, and Tuv is an average transmission from 190-370 nm. The diffuser of Example 14, for example, as shown in FIG. 15 by curve (a), has a transmission of about 40% at the IR wavelength of 2300 nm (this is significant less than the 70-75% of the Comparative Examples in FIG. 13).

Figure 14:
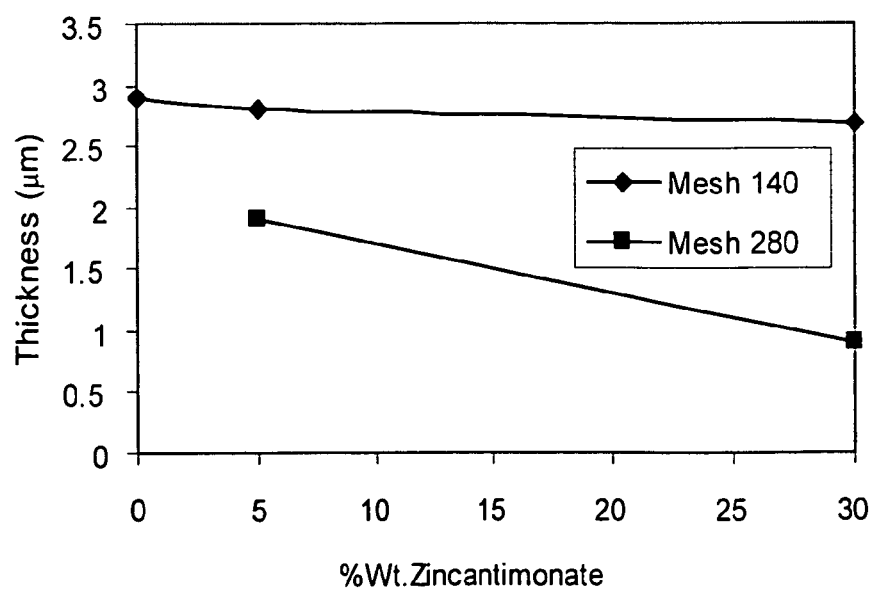
FIG. 14 is a thickness vs. % Wt. of zinc antimonate illustrating the effect of different mesh sizes on the thickness of a coating with respect to Examples 14-17.

Example 15 relates to a diffuser as shown in FIG. 5. The diffuser D of Example 15 was made as follows. Example 15 was the same as Example 14, except that the screen used with a mesh size of 140 in Example 14 was replaced in Example 15 with a mesh size 280. The diamond curve in FIG. 14 illustrates the thickness of the Example 14 coating, whereas the square curve in FIG. 14 illustrates the thickness of the Example 15 coating given the amount of zinc antimonite used. The larger mesh size results in a thinner coating as shown in FIG. 14. The optical spectrum of the diffuser D of Example 15, including the tempered glass substrate 1 and IR blocking/diffusive coating 10, is shown by curve (b) in FIG. 15, and the diffuser had a Tuv of about 35.3%, and a $T_{vis}$ of about 75.4%. The thinner coating resulted in higher visible transmission as can be seen in FIGS. 14-15.

Example 16 relates to a diffuser as shown in FIG. 5. The diffuser D of Example 16 was made as follows. A composite slurry was made by mixing 70%, by weight, of Ferro 20-8099 frit (glass frit) with 30%, by weight, of a colloidal dispersion of 10-20 nm particle size zinc antimonate obtained from Nissan Chemicals. The zinc antimonate (same as antimonite herein) acts as an IR blocker. The mixing and heat treatment were the same as in Example 14. The thickness of the coating 10 is shown in FIG. 14. The optical spectrum of the diffuser D of Example 16, including the tempered glass substrate 1 and IR blocking/diffusive coating 10, is shown by curve (c) in FIG. 15, and the diffuser had a $T_{IR}$ (IR transmission) of about 20.5%, a Tuv of about 12.3%, and a $T_{vis}$ of about 53.1%. FIG. 15 illustrates that the higher amount of IR blocker in the coating resulted in a lower and thus better IR transmission for this diffuser (a lower $T_{IR}$). Additionally, for purpose of comparison, curve (a) in FIG. 13 illustrates a Comparative Example diffuser with a glass substrate and a coating of only Ferro 20-8089 frit (with no IR or blocker in the coating) prepared under the same conditions, and curve (b) in FIG. 13 illustrates a Comparative Example diffuser with a glass substrate and a coating of only Ferro 20-8099 frit (with no IR or blocker in the coating) prepared under the same conditions. It can be seen that the diffuser of Example 16 (curve (c) in FIG. 15) had a much better (lower) transmission in the IR range compared to the Comparative Examples (curves (a) and (b) in FIG. 13). In particular, by comparing the diffusers have mere frit coatings (curves (a) and (b) in FIG. 13) with the Example 16 diffuser with the IR blocking coating 10 (curve (c) in FIG. 15), it can be seen that Example 16 diffuser had much improved IR blockage (i.e., IR transmission was substantially reduced in Example 16 compared to the Comparative Examples of FIG. 13).

Example 17 relates to a diffuser as shown in FIG. 5. The diffuser D of Example 17 was made as follows. Example 17 was the same as Example 16, except that the screen used with a mesh size of 140 in Example 16 was replaced in Example 17 with a mesh size 280. The thickness of the coating is shown in FIG. 14. The optical spectrum of the diffuser D of Example 17, including the tempered glass substrate 1 and IR blocking/diffusive coating 10, is shown by curve (d) in FIG. 15. FIG. 23 illustrates that the diffuser of this Example had a $T_{IR}$ of 30.8%. It can be seen by comparing FIGS. 13 and 15 that the diffuser of this Example had a much better (lower) IR transmission than did the Comparative Examples of FIG. 13.

Figure 16:
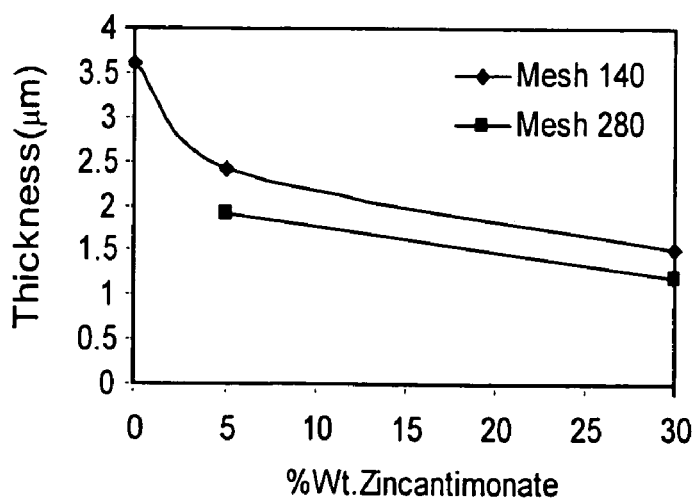
FIG. 16 is a thickness vs. % Wt. of zinc antimonate illustrating the effect of different mesh sizes on the thickness of a coating with respect to Examples 18-21.
Figure 17:
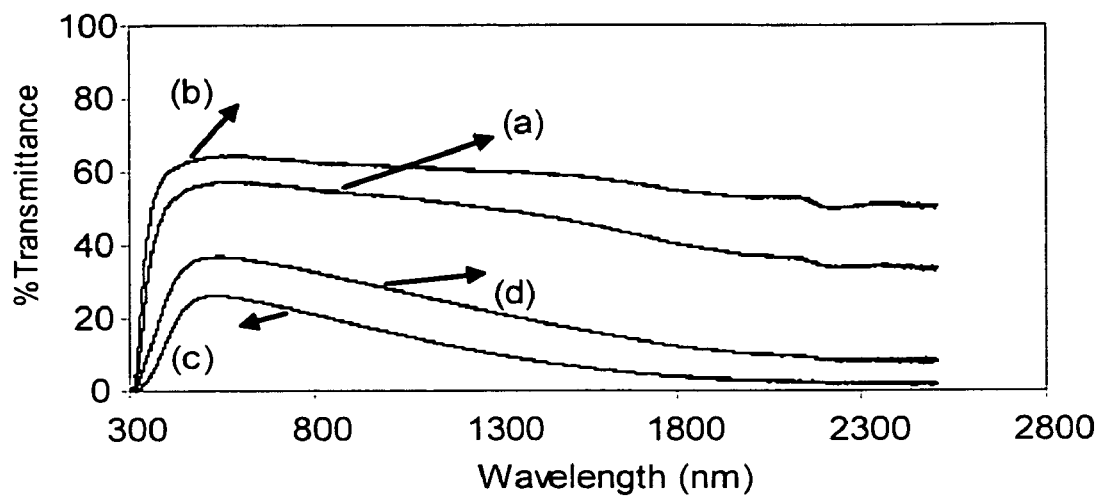
FIG. 17 is a transmission v. wavelength graph illustrating the optical characteristics of Examples 18-21.

Example 18 relates to a diffuser as shown in FIG. 5. The diffuser D of Example 18 was made as follows. Example 18 was the same as Example 14, except that the Ferro frit 20-8089 was replaced with Ferro frit 20-8099. The thickness of the coating 10 is shown in FIG. 16. The optical spectrum of the diffuser D of Example 18, including the tempered glass substrate 1 and IR blocking/diffusive coating 10, is shown by curve (a) in FIG. 17. FIG. 23 illustrates that the diffuser of this Example had a $T_{IR}$ of 42.2%. It can be seen by comparing FIGS. 13 and 17 that the diffuser of this Example had a much better (lower) IR transmission than did the Comparative Examples of FIG. 13.

Example 19 relates to a diffuser as shown in FIG. 5. The diffuser D of Example 19 was made as follows. Example 19 was the same as Example 18, except that the screen size was 280. The thickness of the coating 10 is shown in FIG. 16. The optical spectrum of the diffuser D of Example 19, including the tempered glass substrate 1 and IR blocking/diffusive coating 10, is shown by curve (b) in FIG. 17. It can be seen by comparing FIGS. 13 and 17 that the diffuser of this Example had a better (lower) IR transmission than did the Comparative Examples of FIG. 13.

Example 20 relates to a diffuser as shown in FIG. 5. The diffuser D of Example 20 was made as follows. Example 20 was the same as Example 16, except that the Ferro frit 20-8089 was replaced with Ferro frit 20-8099. The thickness of the coating 10 is shown in FIG. 16. The optical spectrum of the diffuser D of Example 20, including the tempered glass substrate 1 and IR blocking/diffusive coating 10, is shown by curve (c) in FIG. 17. FIG. 23 illustrates that the diffuser of this Example had a $T_{IR}$ of 5.1%. The additional zinc antimonite resulted in better IR blocking. It can be seen by comparing FIGS. 13 and 17 that the diffuser of this Example had a much better (lower) IR transmission than did the Comparative Examples of FIG. 13.

Example 21 relates to a diffuser as shown in FIG. 5. The diffuser D of Example 21 was made as follows. Example 21 was the same as Example 20, except that the screen size was 280. The thickness of the coating 10 is shown in FIG. 16. The optical spectrum of the diffuser D of Example 21, including the tempered glass substrate 1 and IR blocking/diffusive coating 10, is shown by curve (d) in FIG. 17. FIG. 23 illustrates that the diffuser of this Example had a $T_{IR}$ of 14.0%. It can be seen by comparing FIGS. 13 and 17 that the diffuser of this Example had a better (lower) IR transmission than did the Comparative Examples of FIG. 13.

The following Examples 22-25 also have UV blocking material (e.g., $TiO_2$), as well an IR blocking material, in the coating. Thus, following examples (e.g., Examples 22-25) include a coating 10 that blocks significant amounts of both IR and UV radiation, as well as acts as a diffusing coating.

Figure 18:
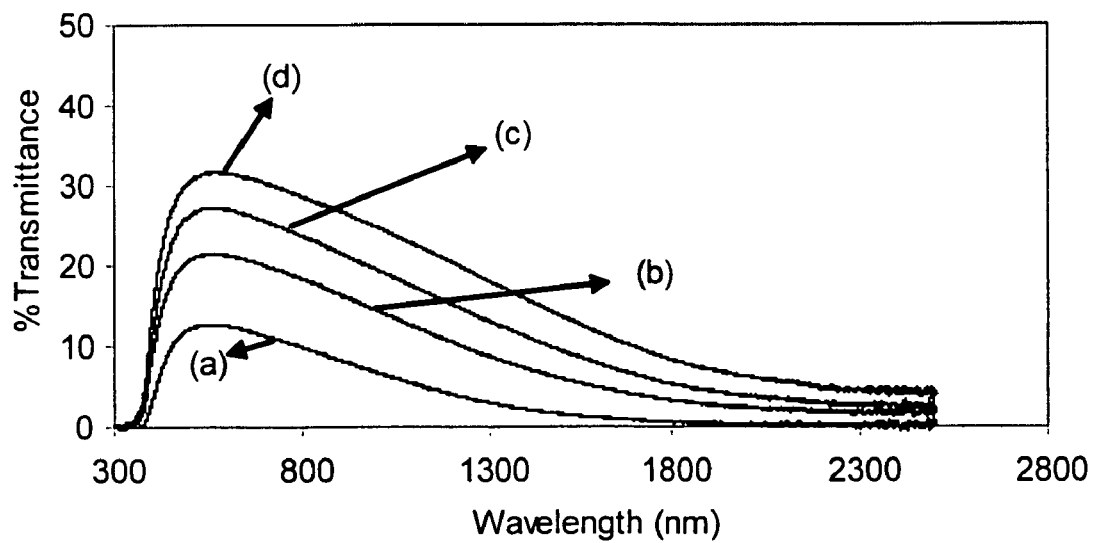
FIG. 18 is a transmission v. wavelength graph illustrating the optical characteristics of Examples 22-25.
Figure 19:
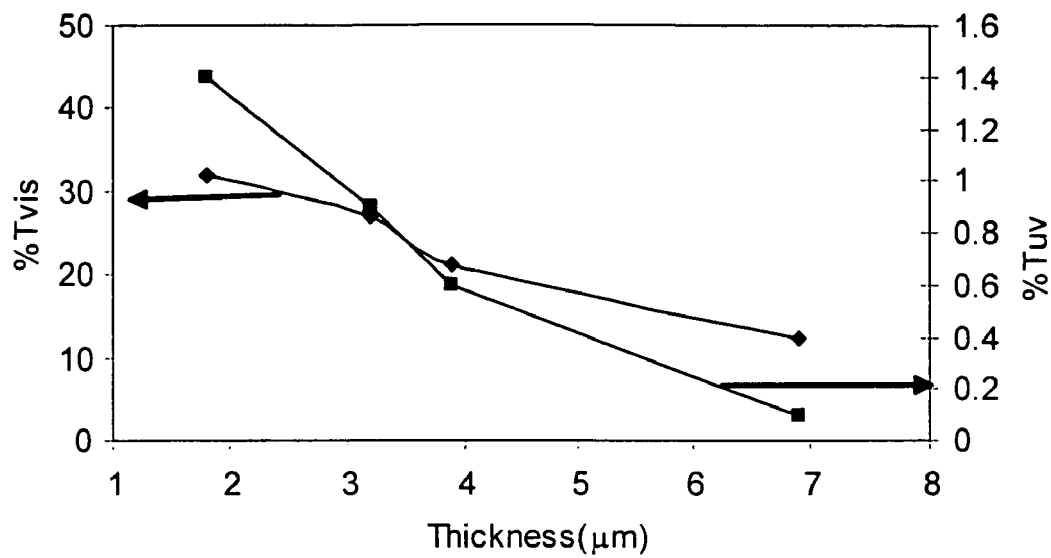
FIG. 19 is a thickness vs. transmission curve illustrating the optical characteristics and thicknesses of diffusers of Examples 22-25.

Example 22 relates to a diffuser as shown in FIG. 5. The diffuser D of Example 22 was made as follows. A composite slurry was made by mixing 60%, by weight, of Ferro 20-8099 frit (glass frit) with 30%, by weight, of a colloidal dispersion of 20-40 nm particle size zinc antimonate obtained from Nissan Chemicals, and 10% by weight of a colloidal dispersion of 280 nm particle size titania (UVCW30) obtained from Elements. The zinc antimonate (same as antimonite herein) acts as an IR blocker, whereas the titania acts as a UV blocker. The IR and UV blocking coating was applied on a 3 mm thick glass substrate 1 by using a screen printing technique using screen with a mesh size 140. The mixing and heat treatment were the same as in Example 14. The optical spectrum of the diffuser D of Example 22, including the tempered glass substrate 1 and IR and UV blocking/diffusive coating 10, is shown by curve (a) in FIG. 18. FIG. 24 illustrates that the diffuser of this Example had a $T_{IR}$ of 3.4%. Coating 10 thickness of this Example is shown in FIG. 19. It can be seen by comparing FIGS. 13 and 18 that the diffuser of this Example had a better (lower) IR transmission than did the Comparative Examples of FIG. 13. Moreover, it can be seen in FIG. 18 that the diffuser D of this Example had a better (lower) UV transmission as well as a better (lower) IR transmission than did the Comparative Examples of FIG. 13. It can also be seen by comparing FIGS. 15 and 18 that the diffuser D of this Example had better (lower) UV and IR transmissions than Examples 14-15 for example, apparently due at least to the addition of the titania to the coating 10.

Example 23 was the same as Example 22, except that a screen mesh size of 280 was used in Example 23. The optical spectrum of the diffuser D of Example 23, including the tempered glass substrate 1 and IR and UV blocking/diffusive coating 10, is shown by curve (b) in FIG. 18. Coating 10 thickness of this Example is shown in FIG. 19. FIG. 24 illustrates that the diffuser of this Example had a $T_{IR}$ of 8.0%. It can be seen by comparing FIGS. 13 and 18 that the diffuser of this Example had a better (lower) IR transmission than did the Comparative Examples of FIG. 13. Moreover, it can be seen in FIG. 18 that the diffuser D of this Example had a better (lower) UV transmission as well as a better (lower) IR transmission than did the Comparative Examples of FIG. 13. It can also be seen by comparing FIGS. 15 and 18 that the diffuser D of this Example had better (lower) UV and IR transmissions than Examples 14-15 for example, apparently due at least to the addition of the titania to the coating 10.

Example 24 was the same as Example 22, except that Ferro frit 8089 was used in Example 24 (instead of Ferro frit 8099 in Example 22). The optical spectrum of the diffuser D of Example 24, including the tempered glass substrate 1 and IR and UV blocking/diffusive coating 10, is shown by curve (c) in FIG. 18. Coating 10 thickness of this Example is shown in FIG. 19 (as in FIG. 16, the diamond curve indicates a mesh 140). FIG. 24 illustrates that the diffuser of this Example had a $T_{IR}$ of 10.8%. It can be seen by comparing FIGS. 13 and 18 that the diffuser of this Example had a better (lower) IR transmission than did the Comparative Examples of FIG. 13. Moreover, it can be seen in FIG. 18 that the diffuser D of this Example had a better (lower) UV transmission as well as a better (lower) IR transmission than did the Comparative Examples of FIG. 13. It can also be seen by comparing FIGS. 15 and 18 that the diffuser D of this Example had better (lower) UV and IR transmissions than Examples 14-15 for example, apparently due at least to the addition of the titania to the coating 10.

Example 25 was the same as Example 23, except that Ferro frit 8089 was used in Example 25 (instead of Ferro frit 8099 in Example 23). The optical spectrum of the diffuser D of Example 25, including the tempered glass substrate 1 and IR and UV blocking/diffusive coating 10, is shown by curve (d) in FIG. 18. Coating 10 thickness of this Example is shown in FIG. 19. FIG. 24 illustrates that the diffuser of this Example had a $T_{IR}$ of 14.4%.

Figure 20:
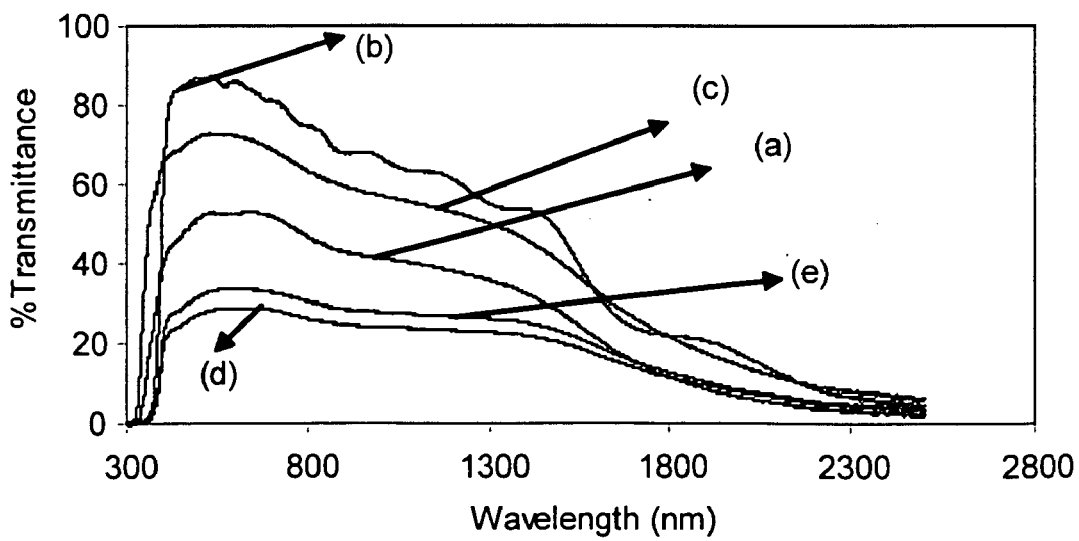
FIG. 20 is a transmission v. wavelength graph illustrating the optical characteristics of Examples 26-29.
Figure 21:
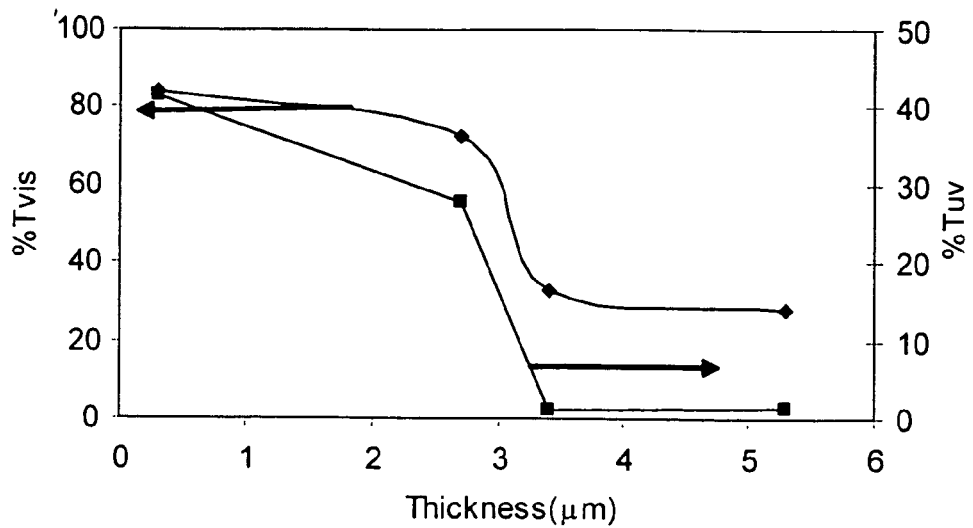
FIG. 21 is a thickness vs. transmission curve illustrating the optical characteristics and thicknesses of diffusers of Examples 26-29.

Example 26 utilized a glass substrate 1 with two layers thereon, namely a fluorinated tin oxide layer for blocking IR and a frit layer for diffusing light. The two layers make up the IR blocking coating 10 in this example. Example 26 was made as follows. A fluorinated tin oxide layer was formed on a glass substrate 1, to block significant portions of IR. Then, over the tin oxide layer, a layer of Ferro frit 20-8089 was formed. The frit layer, for diffusing light, was applied by using a screen printing technique using screen with a mesh size 280. The heat treatment were the same as in Example 14. The optical spectrum of the diffuser D of Example 26, including the tempered glass substrate 1, the IR reflecting layer, and the diffusing layer, is shown by curve (a) in FIG. 20. FIG. 25 illustrates that the diffuser of this Example had a $T_{IR}$ of 21.7%. For purposes of comparison, curve (b) in FIG. 20 illustrates the characteristics of a glass substrate 1 with the fluorinated tin oxide layer thereon, but without the frit layer (thus, it can be seen that the frit also adds some IR blocking functionality, by comparing the curves of layers (a) and (b) in FIG. 20). The thickness of the frit layer of this Example is shown in FIG. 21. It can be seen by comparing FIGS. 13 and 20 that the diffuser of this Example had a better (lower) IR transmission than did the Comparative Examples of FIG. 13.

Example 27 is the same as Example 26, except that Ferro frit 8089 was used in Example 27 for the frit layer. The optical spectrum of the diffuser D of Example 27, including the tempered glass substrate 1, the IR reflecting fluorinated tin oxide layer, and the diffusing layer, is shown by curve (c) in FIG. 20. The thickness of the frit layer of this Example is shown in FIG. 21. It can be seen by comparing FIGS. 13 and 20 that the diffuser of this Example had a better (lower) IR transmission than did the Comparative Examples of FIG. 13. FIG. 25 illustrates that the diffuser of this Example had a $T_{IR}$ of 32.7%.

Examples 28-31 utilized a diffuser having a glass substrate 1, with multiple different layers thereon as shown in FIG. 26. FIG. 26 illustrates that the diffuser D includes a coating 10 that includes an IR blocking fluorinated tin oxide layer 10' and a UV blocking coating 10" thereover.

Example 28 utilized a glass substrate 1 with two layers thereon, namely a fluorinated tin oxide layer 10' for blocking at least some IR and a frit layer with UV blocking material therein 10" for diffusing light and blocking at least some UV. The two layers make up the IR and UV blocking coating 10 in this example, which also diffuses light passing therethrough. Example 28 was made as follows. A pyrolytic fluorinated tin oxide layer 10' was formed on a glass substrate 1, to block significant portions of IR. Then, over the tin oxide layer 10', a composite slurry was made by mixing 90%, by weight, of Ferro 20-8099 frit (glass frit) with 10%, by weight, of a colloidal dispersion of 280 nm particle size titania (UVCW30) obtained from Elements. Both the ingredients were mixed for about five minutes using a shaker mixer. Then the frit inclusive layer was applied over the tin oxide layer by using a screen printing technique using screen with a mesh size 280. The heat treatment were the same as in Example 14. The optical spectrum of the diffuser D of Example 28, including the tempered glass substrate 1, the IR reflecting layer 10', and the diffusing layer 10", is shown by curve (d) in FIG. 20. It can be seen by comparing FIGS. 13 and 20 that the diffuser of this Example had a better (lower) IR transmission than did the Comparative Examples of FIG. 13. FIG. 25 illustrates that the diffuser of this Example had a $T_{IR}$ of 13.6%.

Example 29 is the same as Example 28, except that Ferro frit 8089 was used. The optical spectrum of the diffuser D of Example 29, including the tempered glass substrate 1, the IR reflecting layer 10', and the diffusing layer 10", is shown by curve (e) in FIG. 20. It can be seen by comparing FIGS. 13 and 20 that the diffuser of this Example had a better (lower) IR transmission than did the Comparative Examples of FIG. 13. FIG. 25 illustrates that the diffuser of this Example had a $T_{IR}$ of 15.6%.

Figure 22:
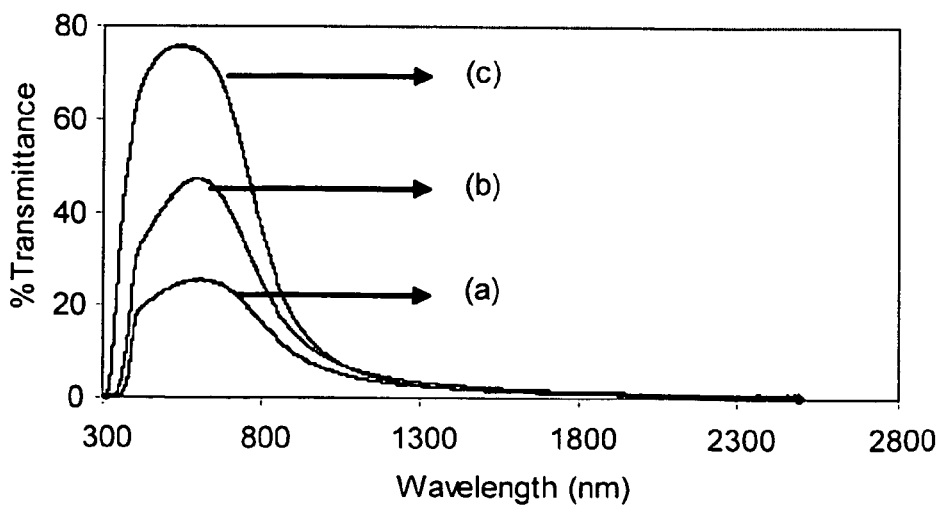
FIG. 22 is a transmission vs. wavelength graph illustrating the optical characteristics of Examples 30 and 31.

Example 30 used a double-silver coating in place of layer 10' in FIG. 26. In particular, the IR blocking coating portion 10' of the coating 10 was made up of a low-E coating including two silver based IR reflecting layers in Example 30. In the low-E coating, dielectric layers were provided between, over and under the silver layers in this Example. Over the low-E coating 10', a composite slurry was made by mixing 95%, by weight, of Ferro 20-8099 frit (glass frit) with 5%, by weight, of a colloidal dispersion of 280 nm particle size titania. Both the ingredients were mixed for about five minutes using a shaker mixer. Then the frit inclusive layer was applied over the low-E coating 10' by using a screen printing technique using screen with a mesh size 280 to form layer 10". The heat treatment were the same as in Example 14. The optical spectrum of the diffuser D of Example 30, including the tempered glass substrate 1, the IR reflecting coating 10', and the diffusing layer 10", is shown by curve (a) in FIG. 22. It can be seen by comparing FIGS. 13 and 22 that the diffuser of this Example had a better (lower) IR transmission than did the Comparative Examples of FIG. 13. For purposes of comparison, curve (c) in FIG. 22 illustrates the properties of the low-E coating 10' alone on the glass substrate 1, with no layer 10" thereover. FIG. 25 illustrates that the diffuser of this Example had a $T_{IR}$ of 2.2%.

Example 31 is the same as Example 30, except that Ferro frit 20-8089 was used (instead of 20-8099). The optical spectrum of the diffuser D of Example 31, including the tempered glass substrate 1, the low-E coating 10', and the diffusing layer 10" (again, 10' and 10" make up the overall coating), is shown by curve (b) in FIG. 22. It can be seen by comparing FIGS. 13 and 22 that the diffuser of this Example had a better (lower) IR transmission than did the Comparative Examples of FIG. 13. For purposes of comparison, curve (c) in FIG. 22 illustrates the properties of the low-E coating 10' alone on the glass substrate 1, with no layer 10" thereover. FIG. 25 illustrates that the diffuser of this Example had a $T_{IR}$ of 3.3%.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. An illumination system comprising:
   a light source for emitting light, the light emitted from the light source including at least visible light and infrared radiation (IR) and optionally including ultraviolet (UV) radiation;
   a diffuser positioned so as to receive light from the light source, the diffuser diffusing visible light received from the light source; and
   wherein the diffuser comprises a single glass substrate that supports an IR blocking coating on a first major side of the glass substrate, and a diffusing coating on a second major side of the glass substrate, and wherein the diffuser has a transmission at a wavelength of about 2300 nm of no greater than about 30%.

2. The illumination system of claim 1, wherein the IR blocking coating comprises zinc antimonate.

3. The illumination system of claim 1, wherein the IR blocking coating also blocks significant amounts of UV radiation, so that the diffuser has a $T_{UV}$ (UV transmission) of no greater than about 20%.

4. The illumination system of claim 1, wherein the IR blocking coating further comprises at least one inorganic oxide selected from the group consisting of Ce, Bi, Ti, Sn and Sb in glass frit.

5. The illumination system of claim 4, wherein the IR blocking coating comprises, by weight, from about 0.1 to 15% of the at least one inorganic oxide selected from the group consisting of Ce, Bi, Ti, Sn and Sb.

6. The illumination system of claim 5, wherein the IR blocking coating comprises, by weight, from about 0.1 to 10% of the at least one inorganic oxide selected from the group consisting of Ce, Bi, Ti, Sn and Sb.

7. The illumination system of claim 1, wherein the IR blocking coating further comprises, by weight, from about 5 to 50% zinc antimonate.

8. The illumination system of claim 1, wherein the IR blocking coating comprises, by weight, at least about 50% frit.

9. The illumination system of claim 1, wherein the diffuser has a transmission at a wavelength of about 2300 nm of no greater than about 20%.

10. The illumination system of claim 1, wherein the diffuser has a $T_{UV}$ of no greater than about 10%.

11. The illumination system of claim 1, wherein the IR blocking coating is in direct contact with the glass substrate.

12. The illumination system of claim 1, wherein the glass substrate is thermally tempered.

13. The illumination system of claim 1, wherein the IR blocking coating comprises a low-E coating for blocking IR radiation and at least one layer comprising a frit located on the glass substrate over at least the low-E coating.

14. The illumination system of claim 1, wherein the IR blocking coating comprises a layer comprising tin oxide and a layer comprising frit located over at least the layer comprising tin oxide.

15. The illumination system of claim 1, wherein the diffuser has a transmission at 325 nm of less than 15%, more preferably less than 10%, and most preferably less than 5%.

16. The illumination system of claim 1, wherein the diffuser has a visible transmission of at least about 35%, more preferably at least about 50%, and even more preferably at least about 60%.

17. The illumination system of claim 1, wherein the diffuser has a transmission at 325 nm of less than 10%.

18. The illumination system of claim 1, wherein the diffuser has a transmission at 325 nm of less than 5%.

19. The illumination system of claim 1, wherein the diffuser has a visible transmission of at least about 50%.

20. The illumination system of claim 1, wherein the diffuser has a visible transmission of at least about 60%.

* * * * *